(12) United States Patent
Hirasawa

(10) Patent No.: US 6,278,489 B1
(45) Date of Patent: *Aug. 21, 2001

(54) IMAGE PICKUP APPARATUS FOR CHANGING A POSITION OF A DETECTION AREA

(75) Inventor: Masahide Hirasawa, Sagamihara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/490,649

(22) Filed: Jun. 15, 1995

(30) Foreign Application Priority Data

Jun. 17, 1994 (JP) .................................................. 6-135664

(51) Int. Cl.[7] ............................ H04N 5/222; G03B 13/00
(52) U.S. Cl. ................. 348/348; 348/333.03; 348/350; 348/354; 396/51; 396/80; 396/121
(58) Field of Search ............................... 348/350, 333, 348/334, 345, 348, 349, 333.01, 333.02, 333.03, 333.04, 351, 354, 355, 356; 396/51, 72, 79, 80, 81, 82; H04N 5/232

(56) References Cited

U.S. PATENT DOCUMENTS

| | | | |
|---|---|---|---|
| 4,920,369 | 4/1990 | Kaneda et al. ........................ | 354/400 |
| 5,214,466 | * 5/1993 | Nagano et al. ........................ | 396/51 |
| 5,216,491 | 6/1993 | Yamamoto et al. .................... | 257/53 |
| 5,245,371 | * 9/1993 | Nagano et al. ........................ | 396/51 |
| 5,541,655 | * 7/1996 | Kaneda ................................. | 348/333 |
| 5,570,156 | * 10/1996 | Arai et al. .............................. | 396/51 |
| 5,579,078 | * 11/1996 | Suzuki .................................. | 396/51 |
| 5,594,500 | * 1/1997 | Tanaka et al. ......................... | 348/345 |
| 5,619,264 | * 4/1997 | Yoshimura et al. ................... | 348/350 |
| 5,678,066 | * 10/1997 | Sato ...................................... | 396/51 |

FOREIGN PATENT DOCUMENTS

| | | | | |
|---|---|---|---|---|
| 4154165 | 5/1992 | (JP) | .............................. | H01L/27/14 |
| 5-130479 | * 5/1993 | (JP) | .............................. | H04N/5/225 |

* cited by examiner

Primary Examiner—Wendy R. Garber
Assistant Examiner—Ngoc-Yen Vu
(74) Attorney, Agent, or Firm—Fitzpatrick, Cella, Harper & Scinto

(57) ABSTRACT

In an image pickup apparatus for capturing a video signal from a predetermined range in an image pickup screen and performing an AF operation based on the signal, a setting position of the range is made variable in the image pickup screen, the range is arranged to be moved to a viewpoint position detected by a viewpoint detecting device, and the AF operation is inhibited for a predetermined time if the setting position of the range is changed. The AF operation is also inhibited if the position to which the range is moved is in a low-contrast state or if the position is for example a display position where characters are displayed.

28 Claims, 29 Drawing Sheets

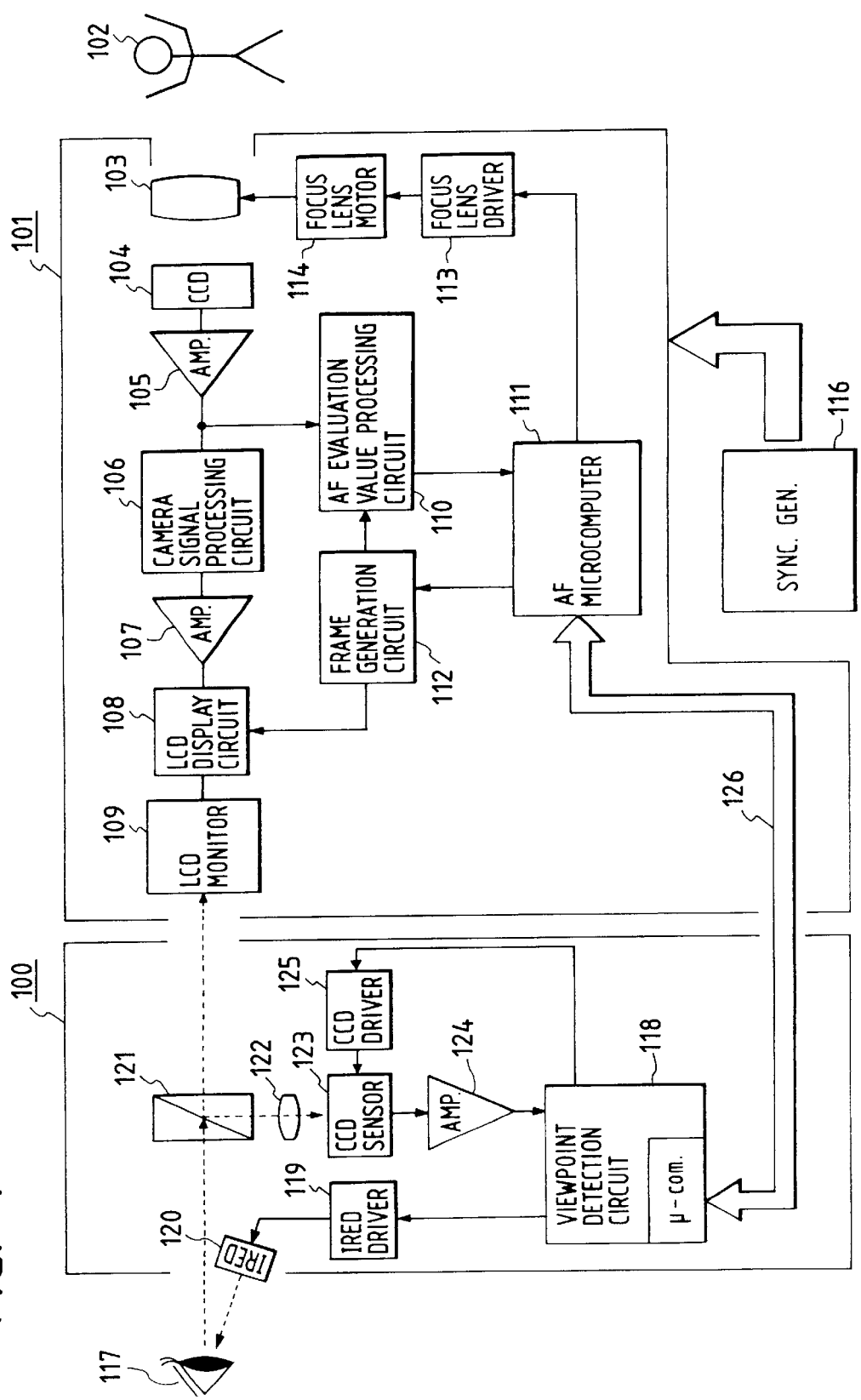

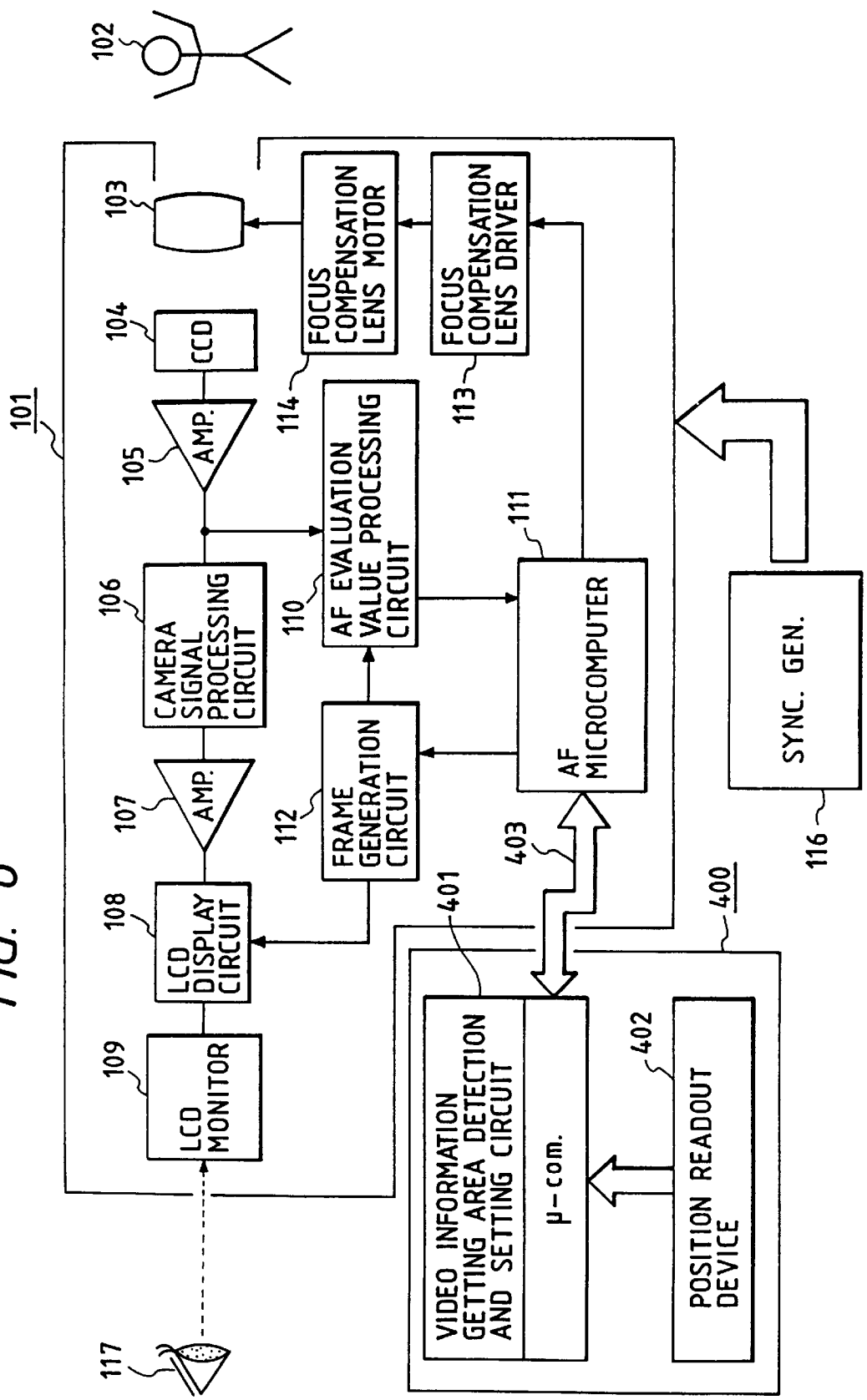

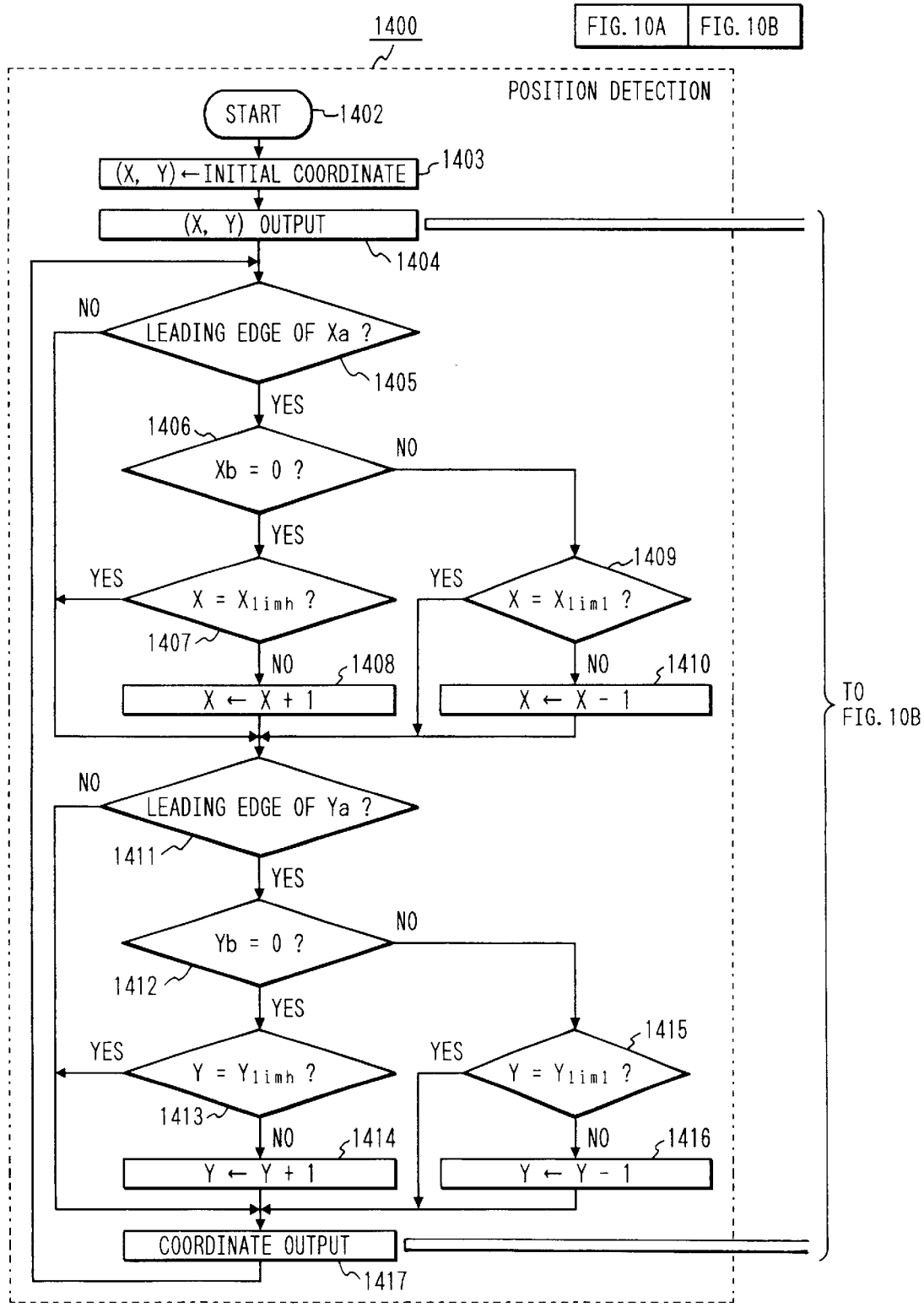

| FIG. 17B | FIG. 17A |

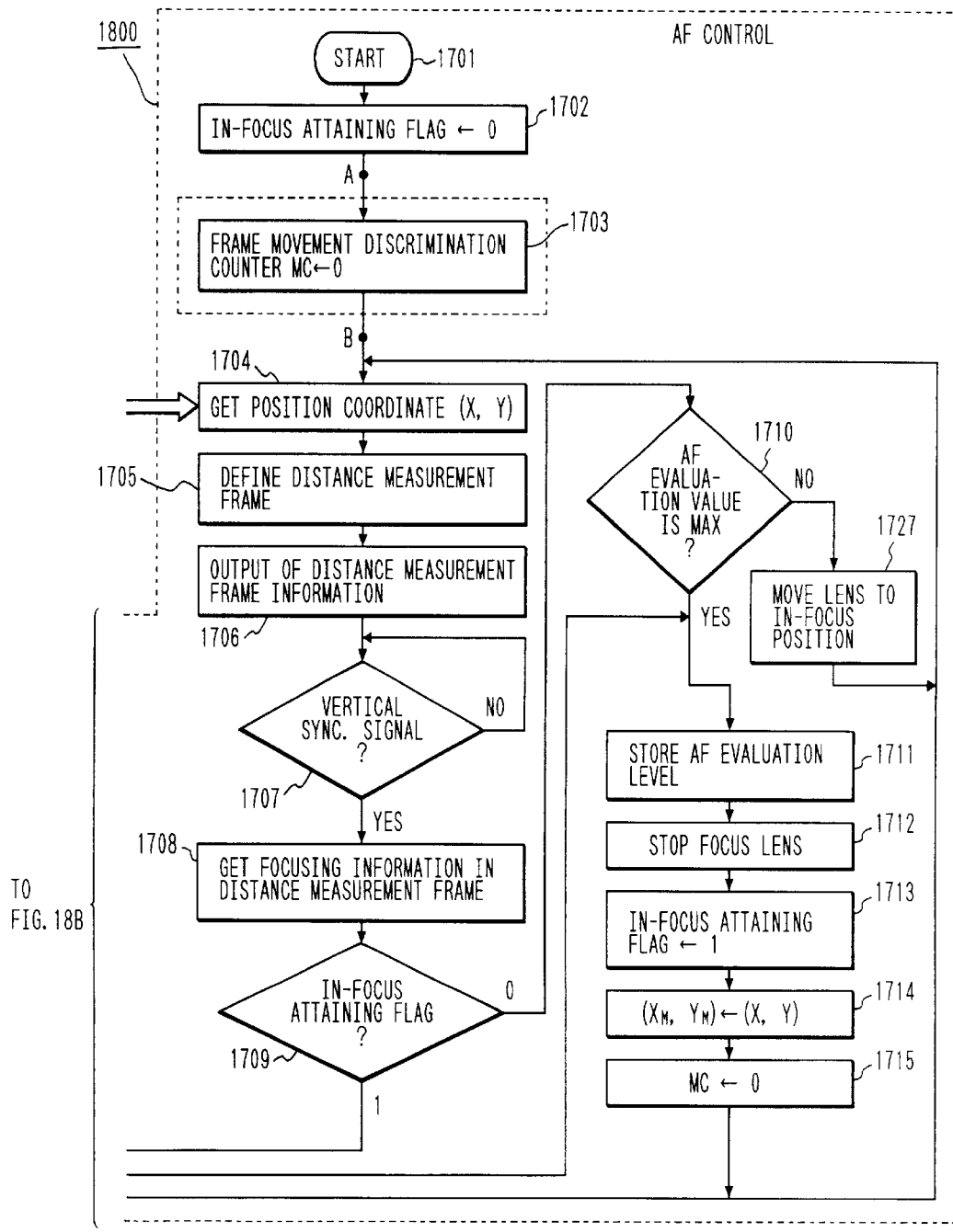

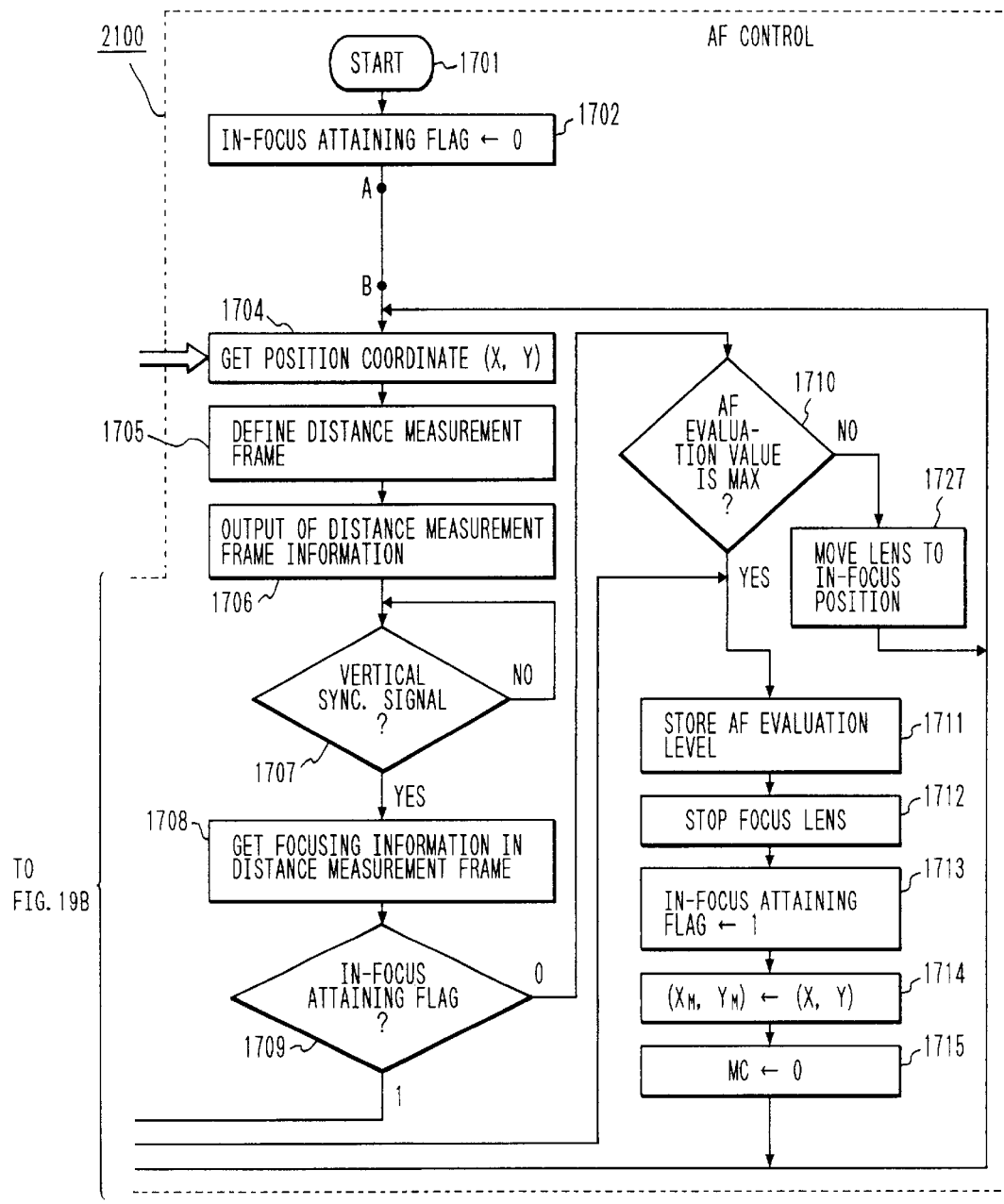

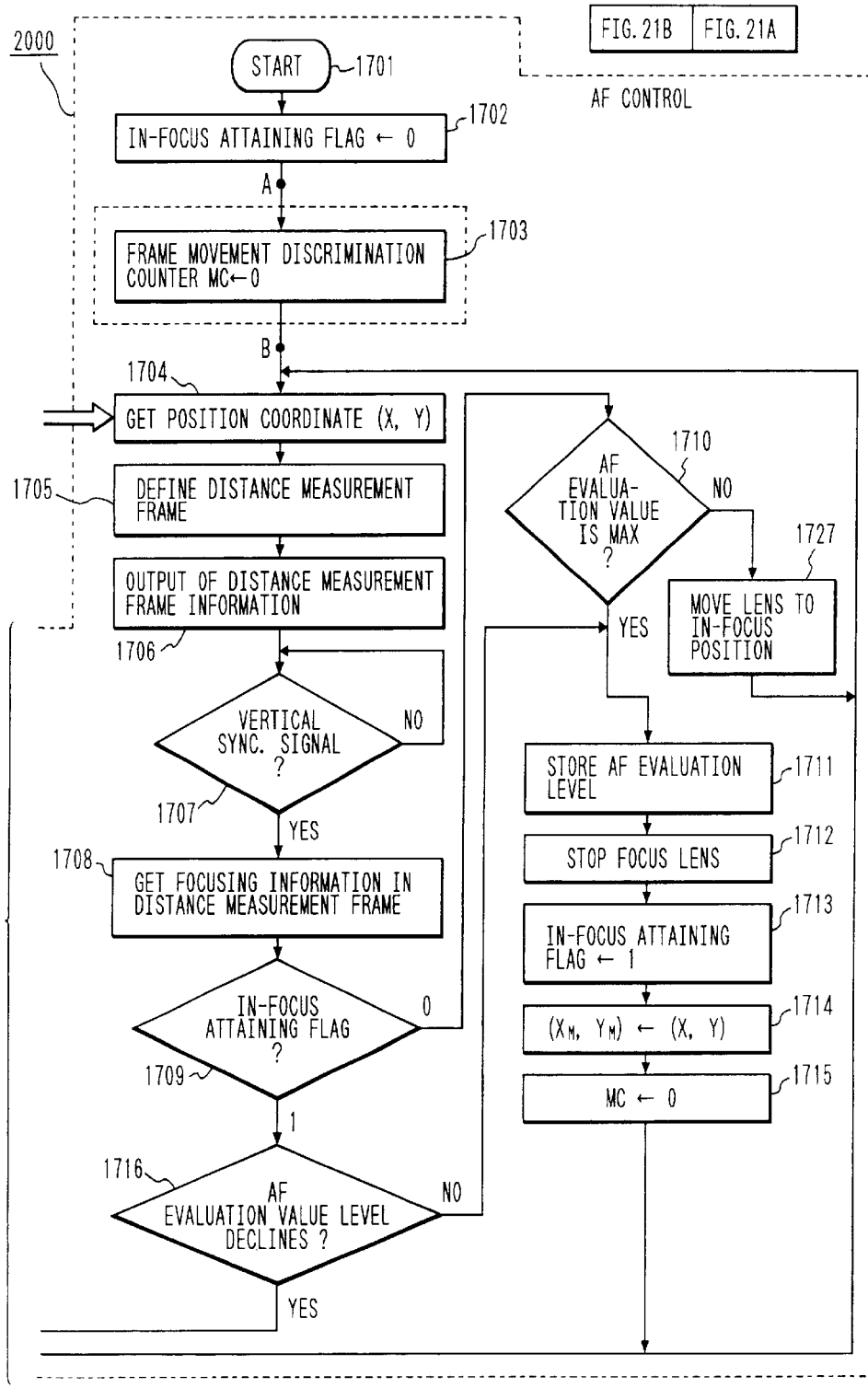

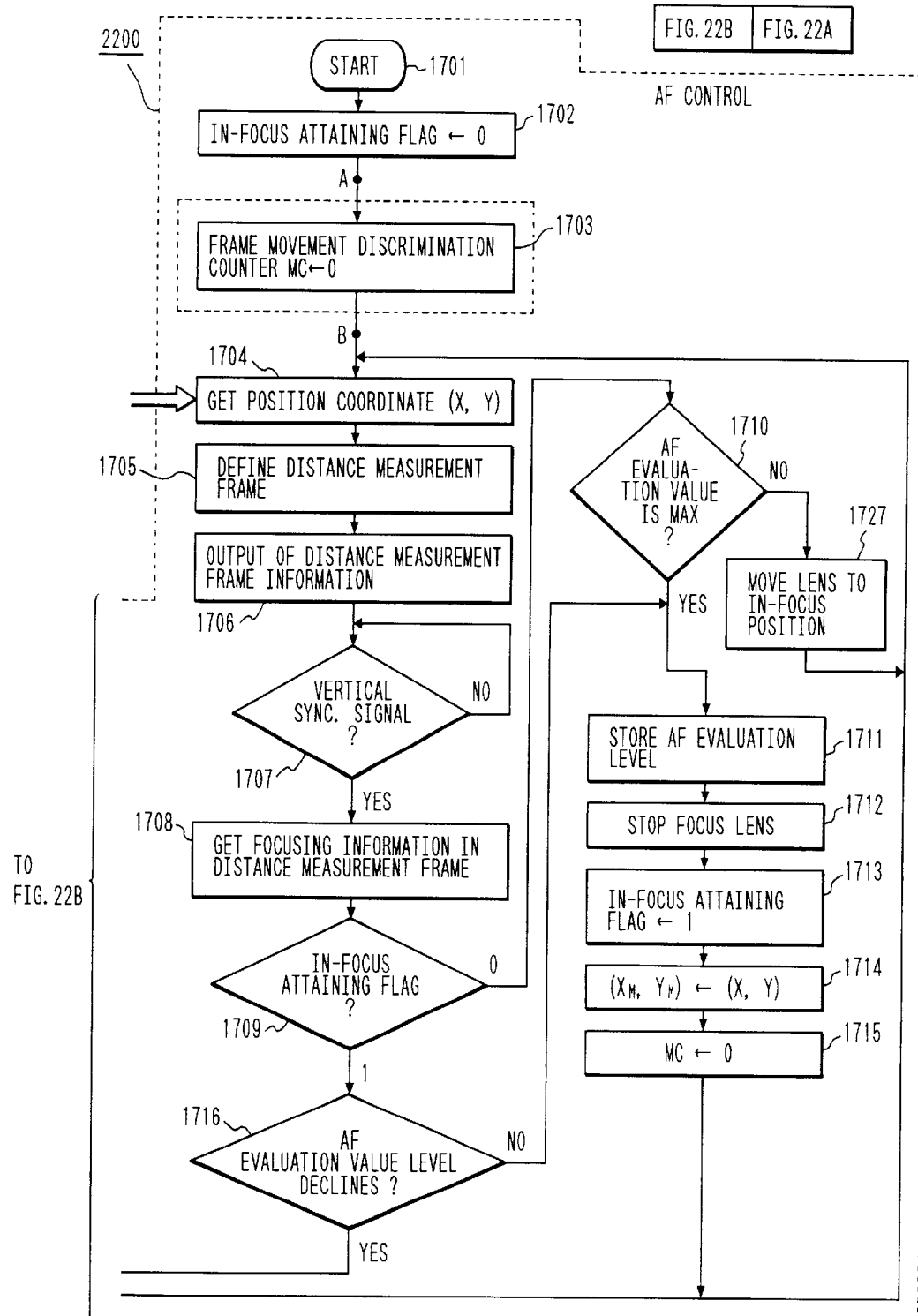

IMAGE PICKUP APPARATUS FOR CHANGING A POSITION OF A DETECTION AREA

BACKGROUND OF THE INVENTION

1. Field of the Invention

The present invention relates to image pickup apparatus, for example such as cameras with a function to capture a certain area in a photographed image as video information and to automatically adjust the focus according to the information, particularly provided with means for changing the position of the capturing area.

2. Related Background Art

A variety of ideas have been presented for obtaining higher-quality images more simply in the fields of consumer-oriented image pickup devices including camcorders. The autofocus (AF) function, coming standard in these years, is for eliminating inconvenience of adjusting the focus every shot, which can be said as a typical example of a function to achieve a purpose to obtain good images simply.

Incidentally, because AF is a mechanism in which an image pickup device such as a camera judges photographic circumstances, so to speak, "at its own discretion" and adjusts the lens position into a state that must be suitable for the circumstances, there are not a few cases where an image does not reflect a photographic purpose of a photographer.

For example, if a far object and a near object coexist in a photographic screen and if the AF operation is carried out using information of the entire photographic screen, the image pickup device will become in focus to either one of the plural objects, but the image pickup device will not be able to determine whether it is surely the main object to be focused.

In order to avoid such circumstances as much as possible, it is usual to employ a technique for performing distance measurement with a weight on an object located at the center of photographic screen and executing AF based on a result of the distance measurement. The reason for this is the fact that the photographer often captures a main object in the screen center upon shooting. This technique has a drawback that the focus cannot be properly adjusted to a main object which is located at a place other than the screen center.

The applicant of the present invention has proposed an image pickup apparatus arranged in such a manner that a photographer looking into a finder can select a main object by his visual axis so as to achieve the best focus no matter where the main object is located in the photographic screen, in Japanese Patent Application No. 4-154165.

FIG. 13 is a drawing to illustrate the operation with the image pickup apparatus. In FIG. 13, reference numeral 800 designates the photographic screen, 102 an image of an object, and 801 a focus detection area (distance measurement frame). The focus detection area 801 is set at a position of a photographer's viewpoint, and the setting position thereof can be freely moved, for example from 801 to 802 in the drawing, by the photographer's changing the position of viewpoint.

The position designating means for selecting the main object does not have to be limited to the viewpoint detecting means, but may be another means for determining a moving direction and a moving position by combining moving amounts on two axes with each other, for example such as a joy stick or a mouse.

In the cases as described above, the image pickup apparatus detects the position of the photographer's viewpoint or the position of another position designating device, and then moves the distance measurement area, corresponding to the detected position.

Incidentally, recent AF systems generally employ a method for detecting a signal according to sharpness from a video signal and using it as an AF evaluation value, but one of the objects hard to deal with by such an AF control using the AF evaluation value is a low-contrast object.

With a low-contrast object, a changing state of AF evaluation level against focus lens position is like a waveform 1102 shown in FIG. 11. The level of AF evaluation value rarely changes no matter whether the object is out of focus or in focus, and the level is wholly so low as to be buried in the noise of electric circuits, which will often result in disabling the detection of change.

In such cases, if the lens starts moving toward the in-focus point, because of influence of the noise the lens could move in the opposite direction to the in-focus point or the lens could continue reciprocating as failing to find a maximum value (which is so called as an action of hunting), thereby giving photography a hitch.

If the focus detection area (distance measurement frame) is moved as shown in FIG. 13, the detection area could capture only a low-contrast portion in the screen though the photographic screen is not a low-contrast object as a whole. Thus, there is a possibility to increase chances to cause the above hitch on photography. A specific example thereof is shown in FIGS. 14A and 14B.

FIGS. 14A and 14B show photographic screens where a man is standing in front of a contrastless background.

For example, if the system is provided with a function to detect the position of viewpoint, as the viewpoint is moved from point 1008 to a position of point 1009 as shown in FIG. 14A, the focus detection area also moves from 1001 to 1002 in the drawing.

Since the focus detection area 1001 includes an image of the man, the man's image can be brought into focus by carrying out the AF operation in this state.

However, the detection area 1002 does not include the man and captures only a portion with no contrast at all as video information. When the AF operation is executed in this state, it will result in moving the focus lens 103 to cause the above-mentioned hitch on photography.

FIG. 14B shows an example in which character indications indicating operational conditions of a camera etc. are superimposed on the display screen of a view finder (a monitor screen of LCD display circuit 109 as detailed later).

In FIG. 14B, numeral 1003 denotes an indication of a type of recording tape (or a recording method) and 1004 indicates that the camera is recording.

Also, 1007 is an indication indicating that information of the date etc. is superimposed on an image to be recorded. The photographer performs photography as always checking such indications through the eye.

For example, if the photographer checks the date after looking at the position of 1010 where the man in the focus detection area 1006 is in focus, the position of the viewpoint moves to 1011 and the focus detection area also moves to 1007.

Although the photographer would like to continue focusing on the man, the focus lens unnecessarily moves also in such a case because the area inside 1007 has no contrast at all as a photographic image as in 1002. This will result in causing unsharpness of the image.

SUMMARY OF THE INVENTION

The present invention has been accomplished to solve the above-described problem, and a first object thereof is to provide an image pickup apparatus arranged to change a position of a detection area such as a distance measurement area, which can perform a stable AF operation without a malfunction even with a change in video state detection signal due to a change of the object image.

A second object of the present invention is to provide an image pickup apparatus arranged in such a manner that when a range for capturing the video state detection signal is changed so as to change the object image and in turn to change the video state detection signal, the focus lens is not restarted if the change is of a short time, whereby a stable AF operation is carried out without a malfunction.

To achieve the above objects, a preferred embodiment according to the present invention comprises an image pickup apparatus having a focus lens, getting means for getting a video state detection signal from a predetermined range in a picked-up picture, adjusting means for adjusting a position of the focus lens in accordance with the video state detection signal, selecting means for selecting the range for getting the video state detection signal by the getting means, and controlling means for inhibiting adjustment of the position of the focus lens by the adjusting means when the range selected by the selecting means is changed.

Another preferred embodiment according to the present invention comprises an image pickup apparatus arranged to suspend immediate movement of the focus lens even with a change in the getting portion of the video state detection signal, caused by a motion including instability of the selecting means, whereby the malfunction in the AF control can be prevented and the stability can be improved.

A third object of the present invention is to provide an image pickup apparatus arranged in such a manner that even if the apparatus is in an AF-incapable state when the getting range of the video state detection signal is changed, the focus lens is not restarted if it is within a certain predetermined period, whereby the stable AF operation can be performed without a malfunction, and even if the video state detection signal is improper when the getting portion of the video state detection signal is changed, the apparatus suspends immediate movement of the focus lens, whereby the malfunction in the AF control can be prevented and the stability can be improved.

In order to achieve such an object, a preferred embodiment according to the present invention comprises an image pickup apparatus including a focus lens, getting means for getting a video state detection signal from a predetermined range in a video signal, adjusting means for adjusting a position of the focus lens in accordance with the video state detection signal, selecting means for selecting a range for getting the video state detection signal, and controlling means for inhibiting adjustment of the position of the focus lens by the adjusting means for a predetermined period of time if the video state detection signal does not satisfy a predetermined condition when the range selected by the selecting means is changed.

A fourth object of the present invention is to provide an image pickup apparatus which is arranged to inhibit setting of a region for getting the video signal with a low-contrast object, whereby the malfunction in the AF operation etc. can be prevented.

A fifth object of the present invention is to provide an image pickup apparatus which can prevent the malfunction in the AF operation etc. and which can secure response performance of AF control.

A sixth object of the present invention is to provide an image pickup apparatus which detects a position of a photographer's viewpoint and sets a detection region at the viewpoint position, whereby the operability is considerably improved, and which can achieve a stable operation without a malfunction in control of AF etc. even with a viewpoint detecting device detects an unstable viewpoint likely to cause detection errors etc. due to variations of viewpoint position, photographer's looking aside, blinks, etc.

A seventh object of the present invention is to provide an image pickup apparatus in which a detection area such as a distance measurement area is set at a position designated by an external input device such as a mouse or a joy stick, whereby the malfunction in the AF control etc. can be prevented and the stability can be improved.

An eighth object of the present invention is to provide an image pickup apparatus which is arranged in such a manner that movement-setting of the detection area is inhibited in a character indication portion, whereby the malfunction of AF can be prevented and that the period of the inhibiting operation is limited to a predetermined time period, whereby the AF operation can be restarted when an object for the photographer to intend to shoot is superimposed on the character indication portion.

The other objects and features of the present invention will be apparent from the specification and the drawings as described below.

BRIEF DESCRIPTION OF THE DRAWINGS

FIG. 4 is a block diagram to show the structure of a camera of the present invention;

FIG. 6 is a block diagram to show the structure of another camera of the present invention;

FIG. 9b is a drawing to show relations between roller rotation amount and output signals for the structure of a mouse illustrated in FIG. 9a.

DETAILED DESCRIPTION OF THE PREFERRED EMBODIMENTS

The present invention will be described in detail with embodiments where a camera according to the present invention is applied to a camcorder.

Individual elements composing the present embodiment are first described in order.

Figure 1:
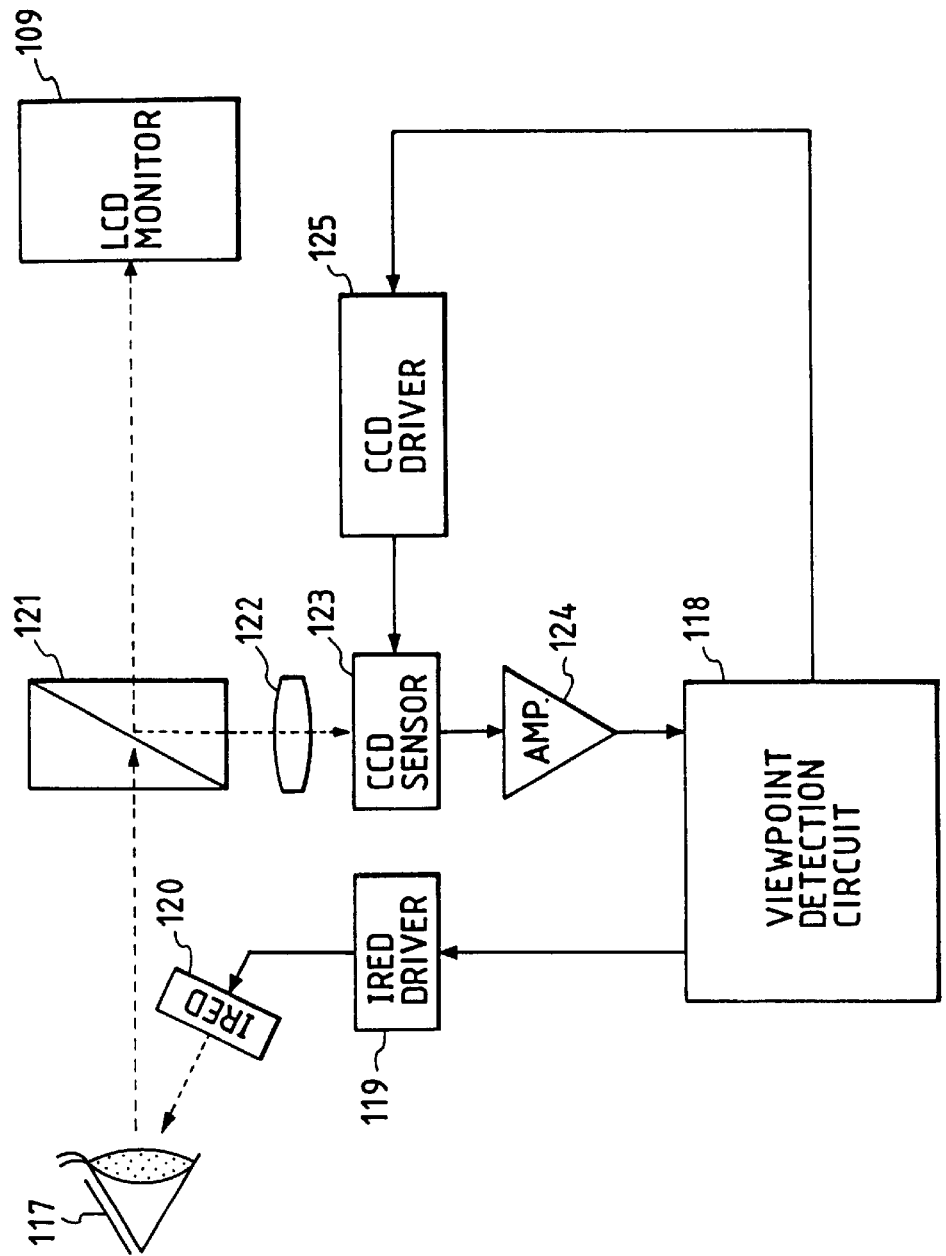
FIG. 1 is a block diagram to show the structure of a viewpoint detecting apparatus being an element of the present invention.

FIG. 1 is a drawing to show the structure of a viewpoint position detecting apparatus. A photographer's eye 117 is watching an LCD (liquid crystal display) monitor in a finder mounted in a camcorder. Infrared light is radiated from an infrared emitting diode (IRED) 120 to the eye 117, and the IRED 120 is driven by an IRED driver 119.

A viewpoint detection circuit 118 controls the operation of the IRED driver 119. The infrared light emitted from the IRED 120 is reflected by the eye 117. The reflected light travels via a dichroic mirror 121 for changing an optical path only of infrared light, and a condenser lens 122, and then is focused on an image sensor 123 such as a CCD for picking up an image of the eyeball (the image sensor will be hereinafter referred to as a CCD).

The CCD 123 is driven by a CCD driver 125 to repeat storage and readout at a predetermined period, and the viewpoint detecting circuit 118 controls the CCD driver 125 in the readout period of the CCD etc. Information read out from the CCD 123 is supplied through an amplifier 124 to the viewpoint detection circuit 118.

Figure 2:
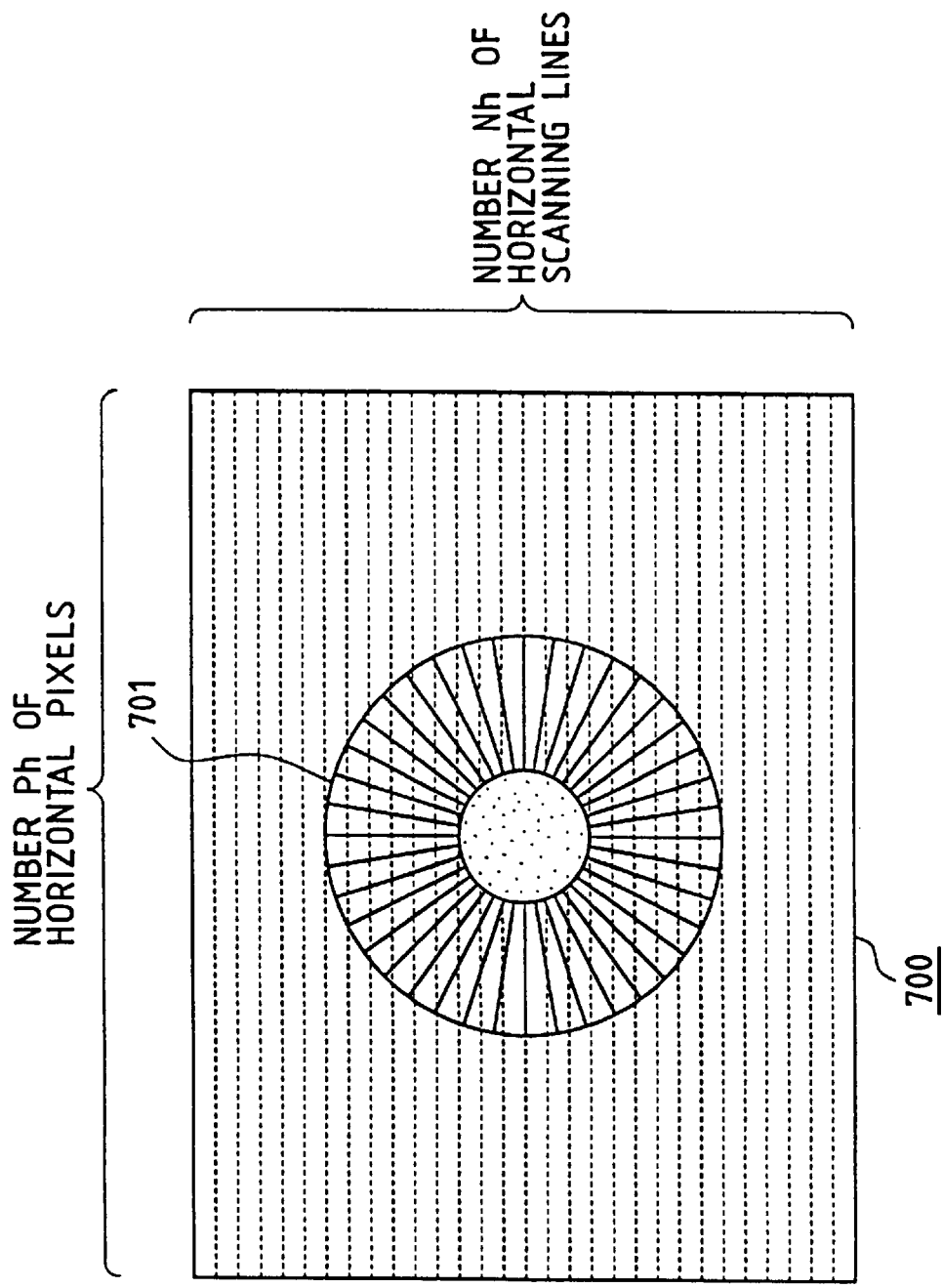
FIG. 2 is a drawing to show an image of an eyeball to be detected by the viewpoint detecting apparatus.

FIG. 2 is a drawing to show an appearance of an eyeball image 701 of eye 117 focused on an image pickup surface 700 on the CCD 123. The viewpoint detection circuit 118 supplies a readout control command to the CCD driver 125 to capture information pixel by pixel in the CCD while performing a horizontal scan, and performs an appropriate process for detecting a position of the viewpoint from the eyeball image shown on the CCD 123 to output information on the position of the viewpoint. Since calculation and analysis algorithms per se for detecting the viewpoint position herein are not directly related to the present invention, the description thereof is omitted herein.

Figure 3:
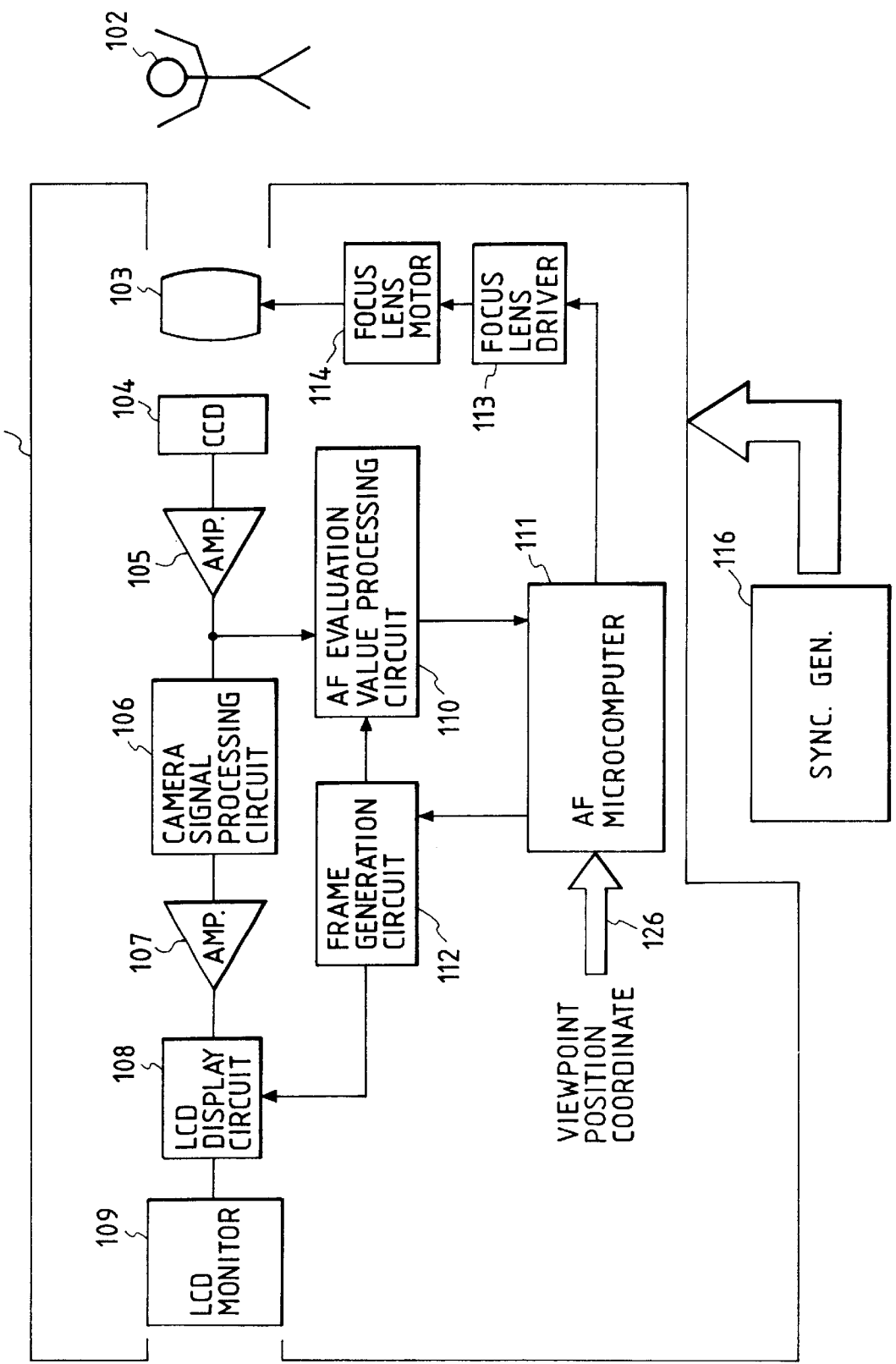
FIG. 3 is a block diagram to show the structure of an AF control unit being an element of the present invention.

Furthermore, FIG. 3 is a block diagram to show a system layout of an AF (autofocus) control unit in the camcorder. In FIG. 3, reference numeral 101 designates a video camera portion including the AF system, and 102 is an object.

Light through a focus lens 103 is focused on an image pickup surface of an image pickup device 104 such as a CCD. An image formed on the image pickup device 104 is photoelectrically converted into video signals, and the resultant video signals are input through an amplifier 105 into a camera signal processing circuit 106.

The camera signal processing circuit 106 executes known processes including generation of luminance and color signals, the gamma process, the blanking process, addition of synchronous signal, etc., and signals output from the camera signal processing circuit 106 are supplied through an amplifier 107 and an LCD display circuit 108 to an LCD monitor 109 to be displayed as a monitor image of the picked-up picture.

An output from the amplifier 105 is also supplied to an AF evaluation value processing circuit 110 for detecting a focus condition, which outputs such an AF evaluation value (for example, a level of high-frequency components in the video signal) as to show a maximum value when a taken image is the sharpest, thereby supplying the evaluation value to a microcomputer for AF control 111 (hereinafter referred to as AF microcomputer).

The AF microcomputer 111 controls a focus lens driver 113 and a focus lens motor 114 to move the focus lens 103 in the optical-axis direction so as to maximize the AF evaluation value.

The AF microcomputer 111 outputs a frame control signal indicating a position of focus detection area and a range of focus detection area, and a frame generation circuit 112 receives the frame control signal to set an AF evaluation value getting range, which is the focus detection area, in an image pickup screen by opening or closing unrepresented gate circuits in the AF evaluation value processing circuit 110. The setting position of the focus detection area in the screen changes depending upon the viewpoint position detected by the viewpoint detecting apparatus shown in FIG. 1. The viewpoint position information is supplied through an information transmission line 126 to the AF microcomputer. Numeral 116 denotes a synchronization signal generator for the system.

FIG. 4 is a block diagram to show the structure of a system in which the above elements are incorporated in a camcorder. In FIG. 4, numeral 100 represents a portion corresponding to the viewpoint position detecting apparatus of FIG. 1, and 101 a portion corresponding to the AF control system of FIG. 3. The LCD monitor 109 is included in 101, and a photographer takes a picture while observing the LCD monitor 109 by the eye 117. The viewpoint position detecting apparatus 100 and the AF control system 101 are enclosed in the camcorder.

The viewpoint position detection circuit 118 includes a microcomputer for calculating a position of the viewpoint, and coordinates of a viewpoint position calculated in the microcomputer are sent through a communication line 126 to a microcomputer for AF control (hereinafter referred to as an AF microcomputer) 111. The AF microcomputer supplies information on position and size of the focus detection area to the frame generation circuit 112, based on the coordinates, and the frame generation circuit 112 controls the AF evaluation value processing circuit 110, based on the information, to form the focus detection area, and transmits a frame display signal to the LCD display circuit 108 to display it on a finder screen.

Figure 5A:
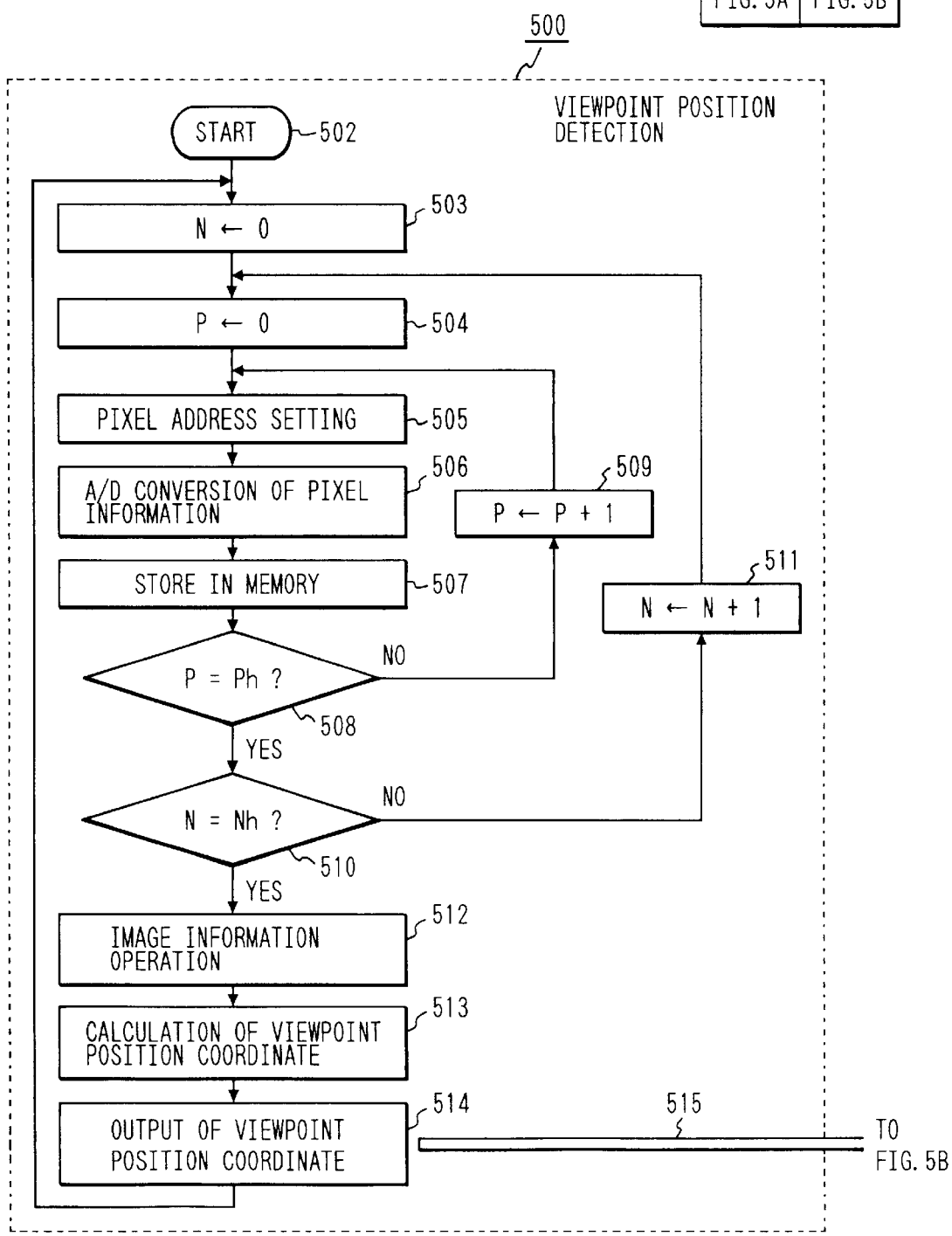
FIG. 5 which comprised of FIGS. 5A and 5B is a flowchart to illustrate the basic operation as a premise of the camera of FIG. 4.
Figure 5B:
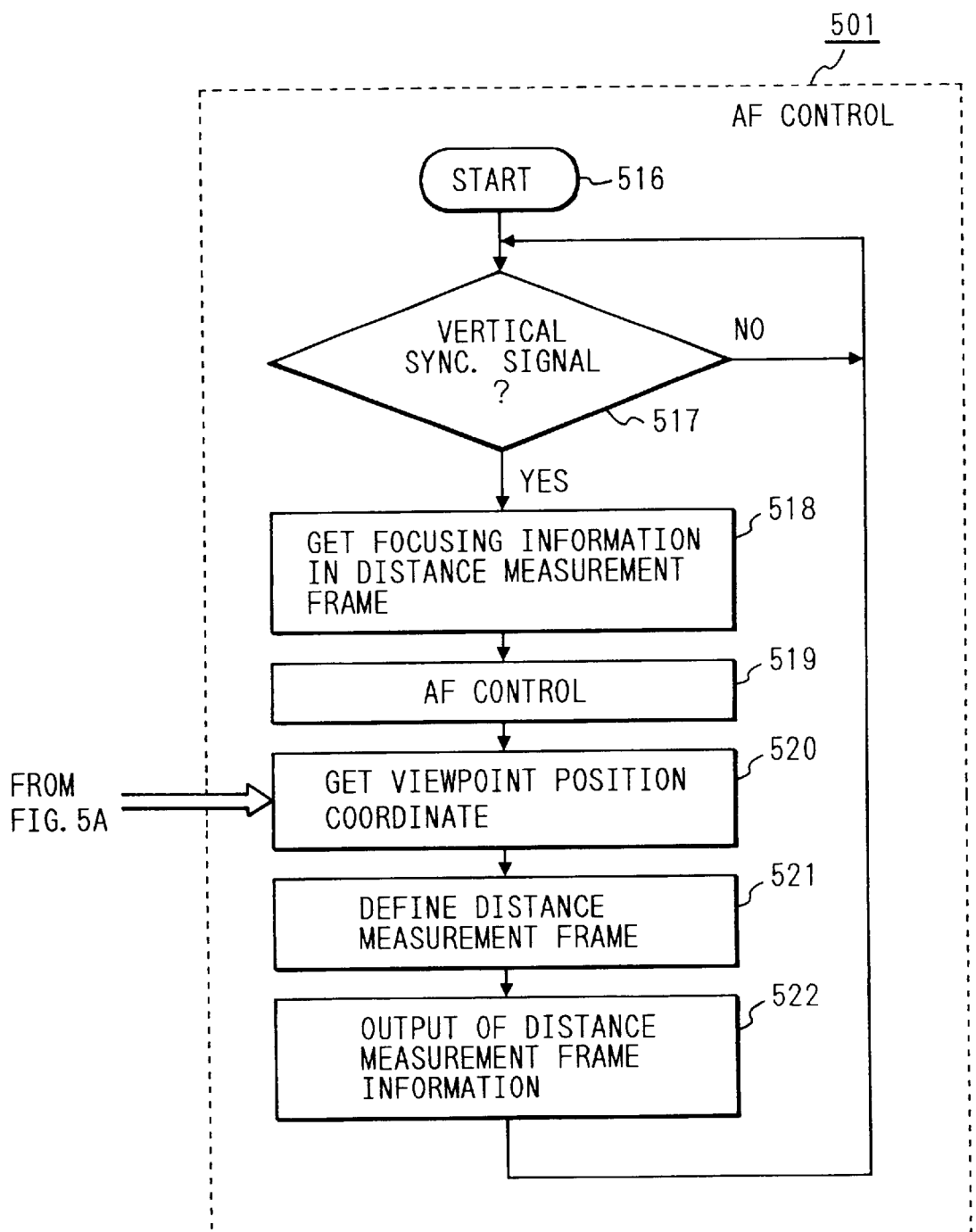

FIGS. 5A and 5B are flowcharts to show processing 500 carried out in the viewpoint position detecting circuit 118 and processing 501 in the AF microcomputer 111 in the system of FIG. 4. First described is the processing 500 in the viewpoint position detection part. The viewpoint position detection is carried out by picking up an eyeball image by the CCD 123.

In FIG. 5A, after step 502 starts execution of the viewpoint position detection processing, step 503 clears a horizontal scan counter N for counting horizontal scan lines to 0, and step 504 clears a pixel counter P for counting pixels in a horizontal direction to 0.

Next step 505 sets a pixel address from values of the horizontal scan counter N and pixel counter P, step 506 captures pixel information of the outstanding address by A/D conversion, and further, step 507 stores the pixel information thus A/D-converted in a memory.

Step 508 checks whether or not the value of pixel counter P is equal to a number Ph of horizontal pixels; if it is not equal, step 509 gives an increment to P to make an address corresponding to a right next pixel designated and then to return to the process of step 505.

When step 508 confirms P=Ph, getting of image information along one horizontal scan line is completed. Thus, step 510 checks if the value of counter N is equal to a number Nh of horizontal scan lines.

If it is not equal, step 511 gives an increment to N so as to make an address corresponding to a next horizontal scan line one below designated, and the flow returns to the process of step 504.

When step 510 confirms N=Nh, it is judged that pixel information of one screen of CCD 123 or sampling of eyeball image is completed. Then, step 512 executes an image information operation, step 513 calculates coordinates of viewpoint position from the result, and step 514 outputs the calculated coordinates of the viewpoint position.

In FIGS. 5A and 5B, 501 designates a flowchart to show a flow of the AF control processing in the AF microcomputer 111. The AF control is carried out by extracting a signal according to sharpness of the image from the video signal output from the image pickup device 104.

After step 516 starts execution of processing, step 517 waits before a vertical synchronization signal arrives.

This is based on the fact that a picture picked up as a video signal composes one screen in a period of one vertical synchronization and the fact that focus information for AF is obtained from the screen.

If necessary, a process for performing initial setting of a position of the distance measurement frame may be inserted before step 517.

When step 517 confirms arrival of the vertical synchronization signal, step 518 captures focus information in the focus detection area in the screen, and step 519 then executes the AF control processing based on the information.

Since the focus detection area moves in the screen in synchronization with the viewpoint position, step 520 captures the coordinates of the viewpoint position detected and calculated by step 514 in the viewpoint position detection part, and based on the information of position coordinates, step 521 finally determines the position of the focus detection area. Then the focus detection area information is output to the frame generation circuit 112 at step 522.

FIG. 6 is a basic structural drawing of a system using a position designating apparatus in place of the viewpoint position detecting apparatus, and blocks with similar functions to those in FIG. 4 are denoted by the same reference numerals.

In FIG. 6, reference numeral 400 designates an apparatus for detecting a position changing depending upon manipulation of the photographer and outputting information concerning the position to the AF microcomputer 111. In the apparatus 400, numeral 401 is a video information getting area detection and setting circuit for setting designated coordinates from the information of a position readout device 402, and the circuit 401 includes a microcomputer.

Numeral 402 denotes a position readout device through which the photographer designates a position in the screen with a control portion and which transmits the information concerning the designated position to 401, and 403 is a communication line for transmitting the information on coordinates set by 401 to the AF microcomputer.

Figure 7:
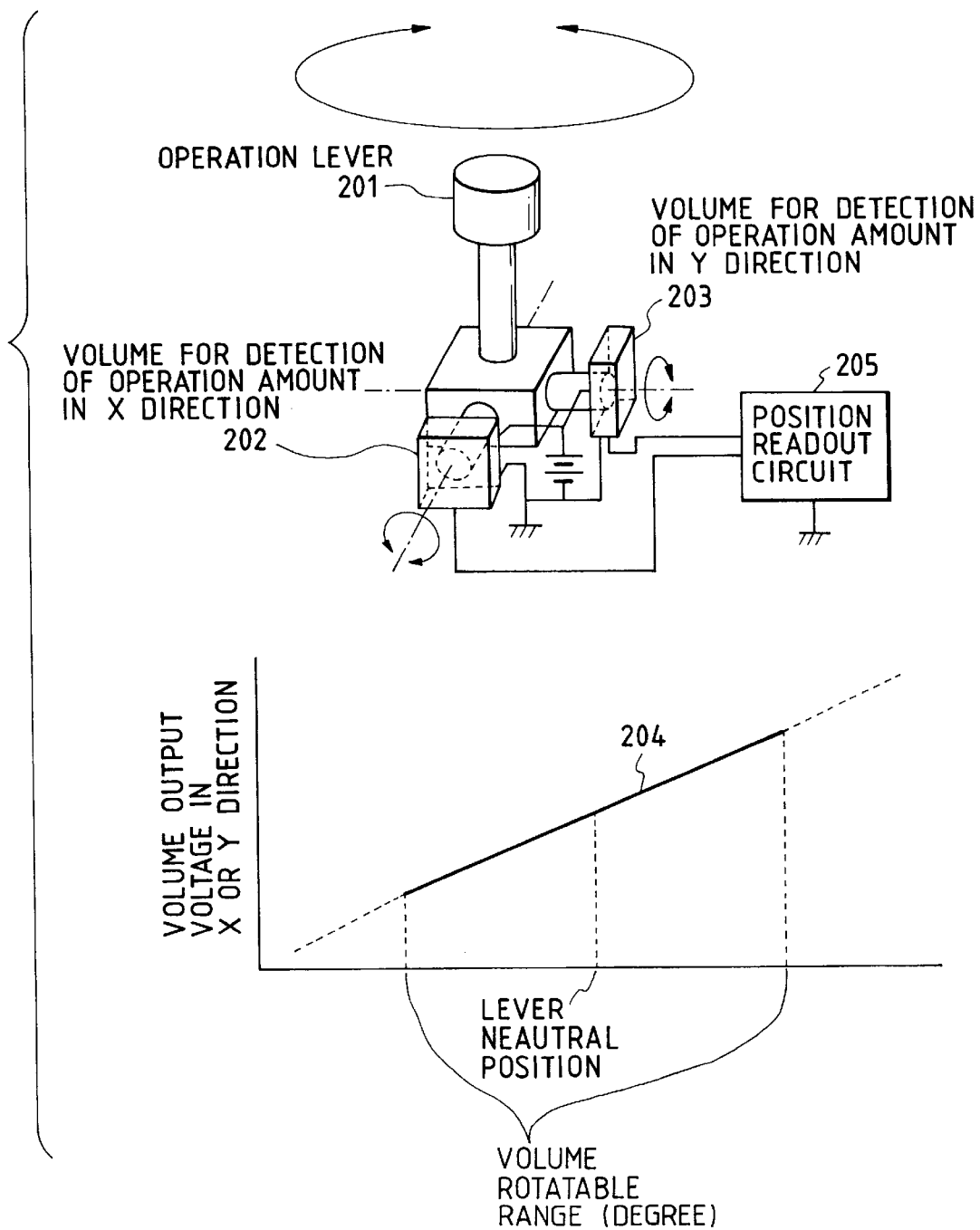
FIG. 7 is a drawing to illustrate the structure of a joy stick as an external input means.

FIG. 7 shows a specific example of the position readout device 402 in FIG. 6, and is a basic structural drawing of a "joy stick" often used in inputting position information into computer.

In FIG. 7, numeral 201 represents an operation lever, and 202, 203 volumes are for decomposing a motion of the joy stick into components in a horizontal (X) direction and a vertical (Y) direction, respectively. An output signal from 202 or 203 is for example as shown by 204, which indicates a voltage proportional to a rotation angle of volume. Namely, an absolute position on a two-dimensional plane can be determined by reading output voltages from 202, 203 and assigning an X coordinate and a Y coordinate to them. Then the outputs from volumes 203, 204 are read out by a position readout circuit 205.

Figure 8:
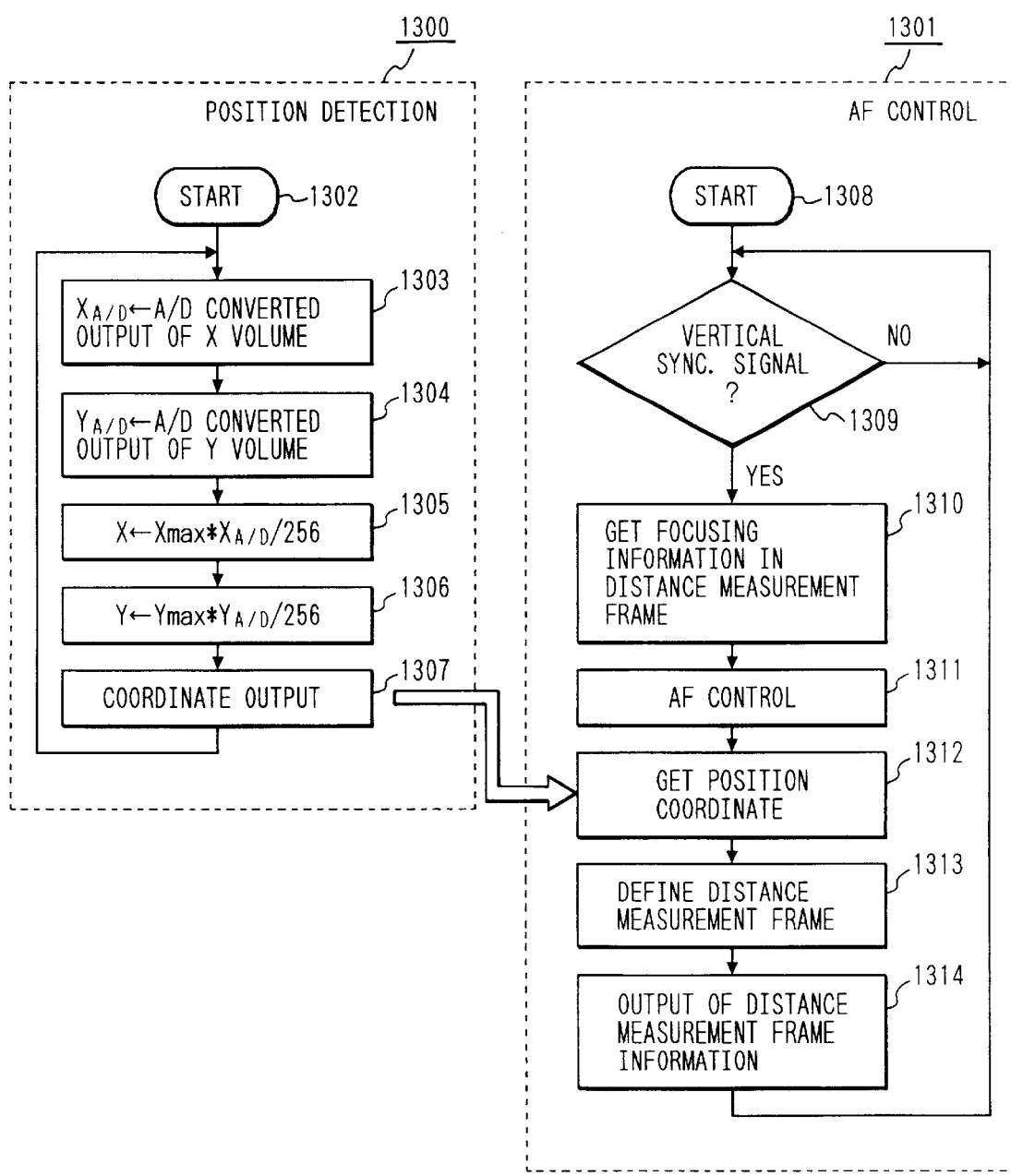
FIG. 8 is a flowchart to show the operation where the structure of the joy stick of FIG. 7 is applied as an external input means to the structure of FIG. 6.

FIG. 8 is a flowchart to show processing 1300 of position detection part in the microcomputer in the video information getting area detection and setting circuit 401 and processing 1301 of AF control part in the AF microcomputer 111 in case of the joy stick being used as a position readout device.

In the processing 1300 of position detection part, when step 1302 starts execution of processing for position detection, step 1303 performs A/D conversion of an output from the volume for detecting lever movement in the X direction to put the thus converted signal into a memory $X_{A/D}$.

Similarly, step 1304 performs A/D conversion of an output from the volume for detecting lever movement in the Y direction to put the converted signal into a memory $Y_{A/D}$.

Supposing the A/D conversion is performed in 8 bits, an A/D-converted value corresponding to the maximum output level of the two volumes is 256, and thus, letting Xmax and Ymax be maximum values of X and Y for the image pickup screen, coordinates (X, Y) of a position designated by the joy stick can be obtained by the following equations.

$$X = X\max * X_{A/D}/256 \quad (1)$$

$$Y = Y\max * Y_{A/D}/256 \quad (2)$$

Step 1305 and step 1306 perform calculations of Equation (1) and Equation (2) to obtain the position coordinates (X, Y), step 1307 outputs the position coordinates (X, Y) to the AF microcomputer 111, and then the flow returns to step 1303. The above processing is repeated in a predetermined period.

On the other hand, in the AF microcomputer 111, after step 1308 starts execution of processing, step 1309 waits before a vertical synchronization signal arrives.

If necessary, a process for performing initial setting of the focus detection area (distance measurement frame) may be inserted before step 1309.

With arrival of a vertical synchronization signal, steps 1310, 1311 capture a video signal and perform the processing for AF control. Then step 1312 starts capturing the position coordinates (X, Y) output in the processing of step 1307 from the video information getting area detection and setting circuit 401.

Based on the position coordinates thus captured, step 1313 finally determines a frame range for capturing of the focus detection information, i.e., the focus detection area (distance measurement frame), and step 1314 outputs the focus detection area information to the frame generating circuit 112.

In FIG. 8, communication from step 1307 to step 1312 is carried out through the communication line 403 in FIG. 6.

FIG. 9 shows another specific example of the position readout device 402 in FIG. 6, and is a basic structural drawing of a so-called "mouse" or "track ball" generally used in personal computers etc. in these years.

Figure 9A:
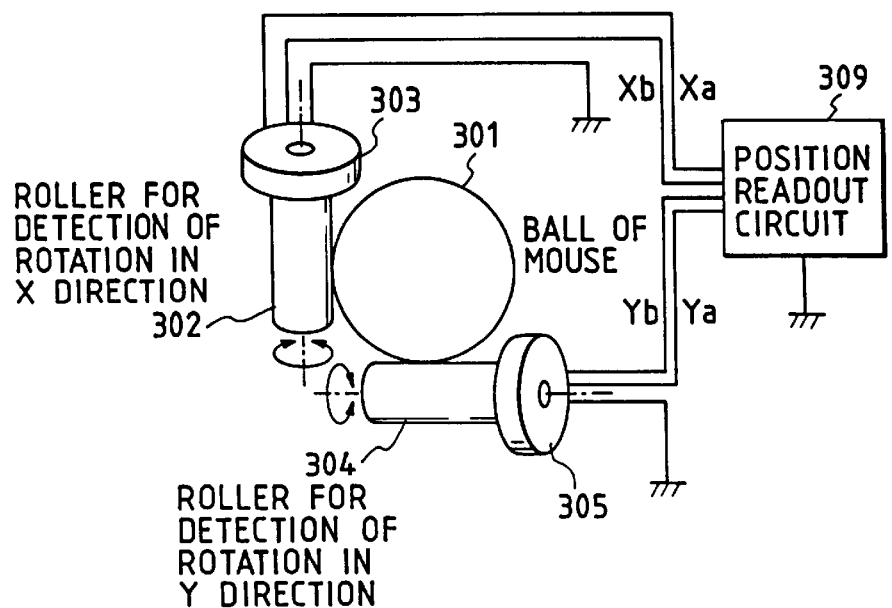
FIG. 9a is a drawing to illustrate the structure of a mouse as an external input means.
Figure 9B:
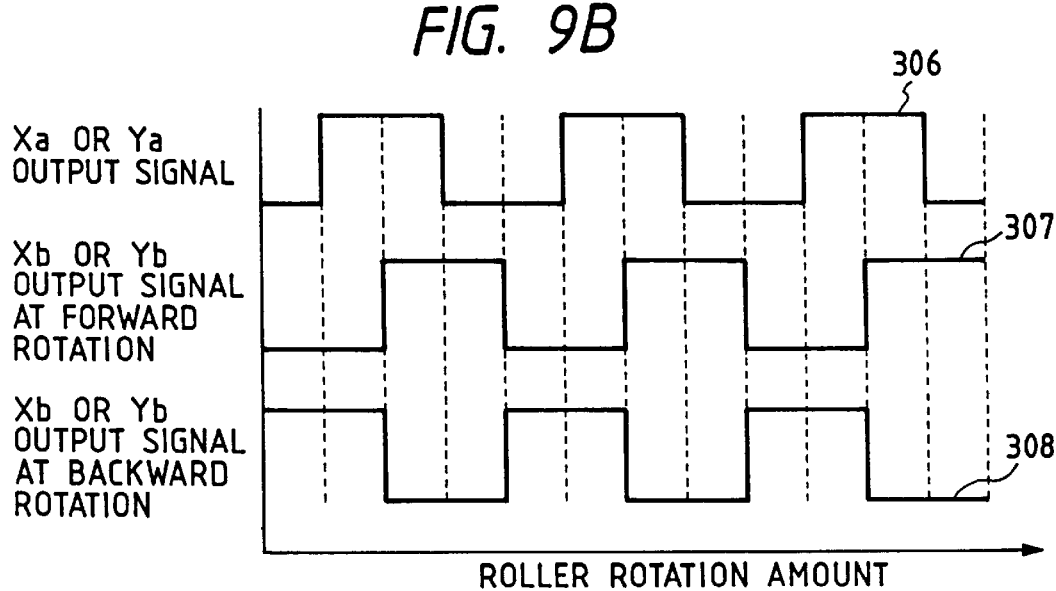

In FIG. 9a, numeral 301 represents a ball for rotating rollers, which rotates when an operator moves the mouse on a two-dimensional plane. Numerals 302, 304 are rollers for decomposing a rotation of the ball into components in a horizontal (X) direction and a vertical (Y) direction, respectively, and rotation detecting sensors 303, 305 are mounted on the rollers 302, 304, respectively. A position readout circuit 309 reads output signals from the position detection sensors 303 and 305. In FIG. 9(b), signal waveforms of the output signals are for example as shown by 306, 307, 308. If Xa or Ya outputs the waveform like 306 when the roller rotates in a direction (called as normal rotation for convenience), Xb or Yb becomes a signal like 307 with a phase shift of 90° relative to 306.

Next, if the roller rotates backward, a signal of Xb or Yb is like 308 relative to 306, and is inverted in phase relative to 307. Namely, a direction of rotation can be determined by detecting a signal phase of Xb or Yb with respect to the reference of Xa or Ya, and a rotation speed can be determined by detecting the period of signal change. Stop of the mouse or track ball is detected with no change of the two output signals.

Figure 10B:
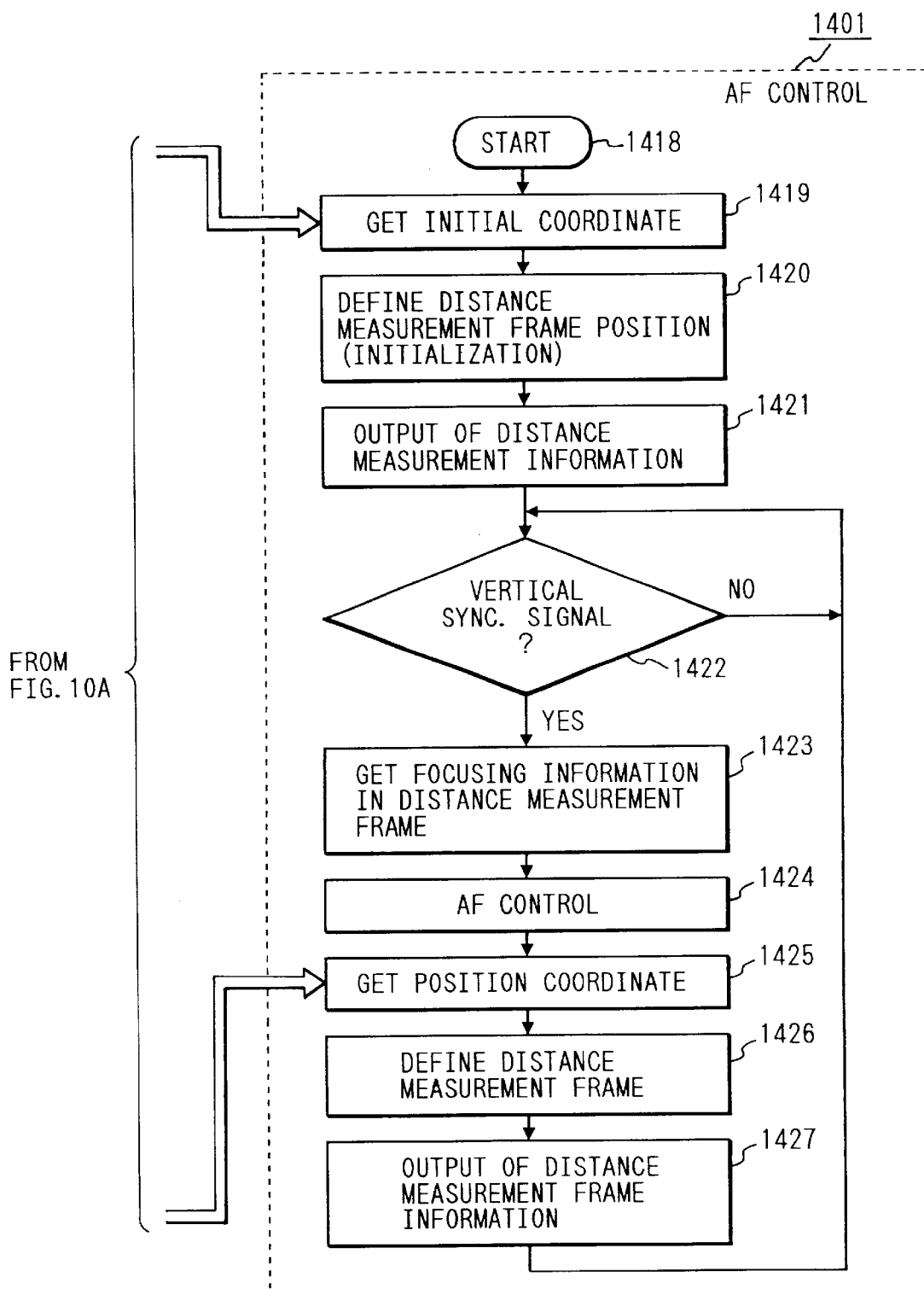
FIG. 10 which is comprised of FIGS. 10A and 10B is a flowchart to show the operation where the structure of the mouse of FIG. 8 is applied as an external input means to the structure of FIG. 9.

FIGS. 10A and 10B are flowcharts to show processing 1400 of the position detection part of the microcomputer in the video information getting area detection and setting circuit 401, and processing 1401 of the AF control part in the AF microcomputer 111 in case of the mouse or track ball being used as a position readout device.

When step 1402 starts execution of the processing of position detection part 1400, step 1403 sets initial coordinates preliminarily determined. This is because the mouse or track ball is not a position setting device of a type which outputs an absolute position, but a position setting device of an increment type which sets a change amount from a certain position. Thus, step 1403 is a process for setting the "certain position."

Specifically, it is desired to select a position easily recognized by the operator's eye, for example at the center of the screen. Step 1404 outputs the initial coordinates set at step 1403 to the AF control part 1401.

Next step 1405 captures a leading edge of Xa shown by 306 in FIG. 9. If no leading edge of Xa is captured at the point of execution of the processing at step 1405, the processing goes to step 1411 to perform the position detection process in the Y direction.

If a leading edge of Xa is captured at step 1405, step 1406 detects a state of Xb of 307 or 308 in FIG. 9.

As shown in FIG. 9, when a leading edge of Xa is captured, the value of Xb becomes 1 or 0 depending upon a direction of an X-directional component in the rotating direction of the ball.

Thus, such processing that X is increased with 0 while X is decreased with 1 is carried out according to the value of Xb at that time.

If the value of Xb is 0, it is judged at step 1407 whether or not the value of X is equal to the maximum value of coordinates corresponding to the image pickup screen. If X is not equal to Xlimh at step 1407, X is given an increment at 1408; if equal, an increment operation of X is not executed assuming that the designated position has already reached the edge of the screen.

If Xb is 1, 1409 detects whether or not the designated position reaches the opposite edge to the position corresponding to Xlimh, by determining if X is equal to Xliml. If it has not reached the edge yet, a decrement operation of X is executed.

Steps 1411, 1412, 1413, 1414, 1415, 1416 execute detection of whether or not the designated position reaches the edge in the image pickup screen for the Y direction and the increment/decrement operations of Y, similarly as performed for the X direction.

The coordinates (X, Y) changing in accordance with rotation of the ball are obtained in the above-described manner. Then step 1417 outputs the coordinates (X, Y) to the AF microcomputer and the processing returns to step 1405 to continue updating the coordinates (X, Y) according to movement of the ball.

The processing 1401 of the AF control part is next described. When step 1418 starts execution of the processing of step 1401, step 1419 starts capturing the initial coordinates from the video information getting area detection and setting circuit 401, step 1420 sets a focus detection area range corresponding to the initial coordinates, and step 1421 outputs the information thereof to the frame generation circuit 112, as focus detection area information.

Step 1422 waits for a vertical synchronization signal, step 1423 captures video information in the focus detection area, and step 1424 performs the AF processing.

Then step 1425 captures the coordinates (X, Y) from the video information getting area detection and setting circuit 401.

Then step 1426 sets a new distance measurement frame based on (X, Y), step 1427 outputs the focus detection area information to the frame generation circuit 112, and then the flow returns to step 1422.

In FIGS. 10A and 10B communication is performed through the communication line 403 from the processing of step 1404 in the position detection part 1400 to the processing of step 1419 in the AF control part 1401 and from step 1417 to step 1425.

As described above, the coordinate information according to a motion of the joy stick, mouse, or track ball is transmitted to the AF microcomputer 111 by reading the motion on the two-dimensional plane, of the joy stick, mouse, or track ball by means of the video information getting area detection and setting circuit 401. Then the AF microcomputer 111 changes the focus detection area and performs the AF processing.

Figure 11:
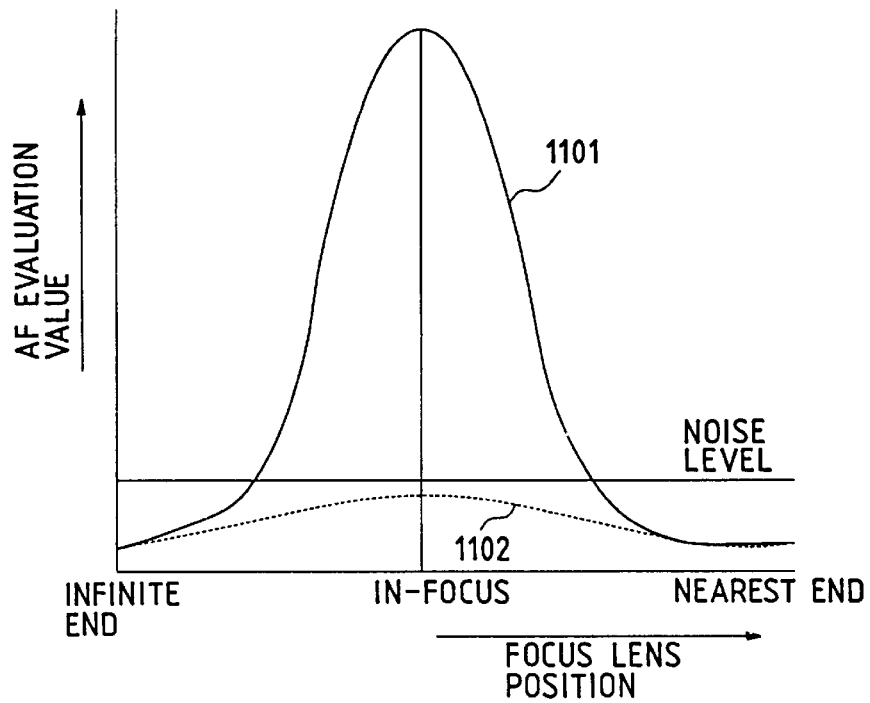
FIG. 11 is a drawing to show relations between changes of AF evaluation values according to movement of the focus lens and a noise level for determining whether an image is low in contrast.

FIG. 11 shows changes of the AF evaluation value signal with movement of the focus lens 103, in which 1101 represents a state of change of the AF evaluation value level when the focus lens is monotonously moved from the infinite focus position to the nearest focus position while photographing an object at a certain object distance.

The AF system of the camera shown in FIG. 4 is arranged to move the focus lens as regarding a maximum point of AF evaluation value 1101 as an in-focus point.

Figure 12:
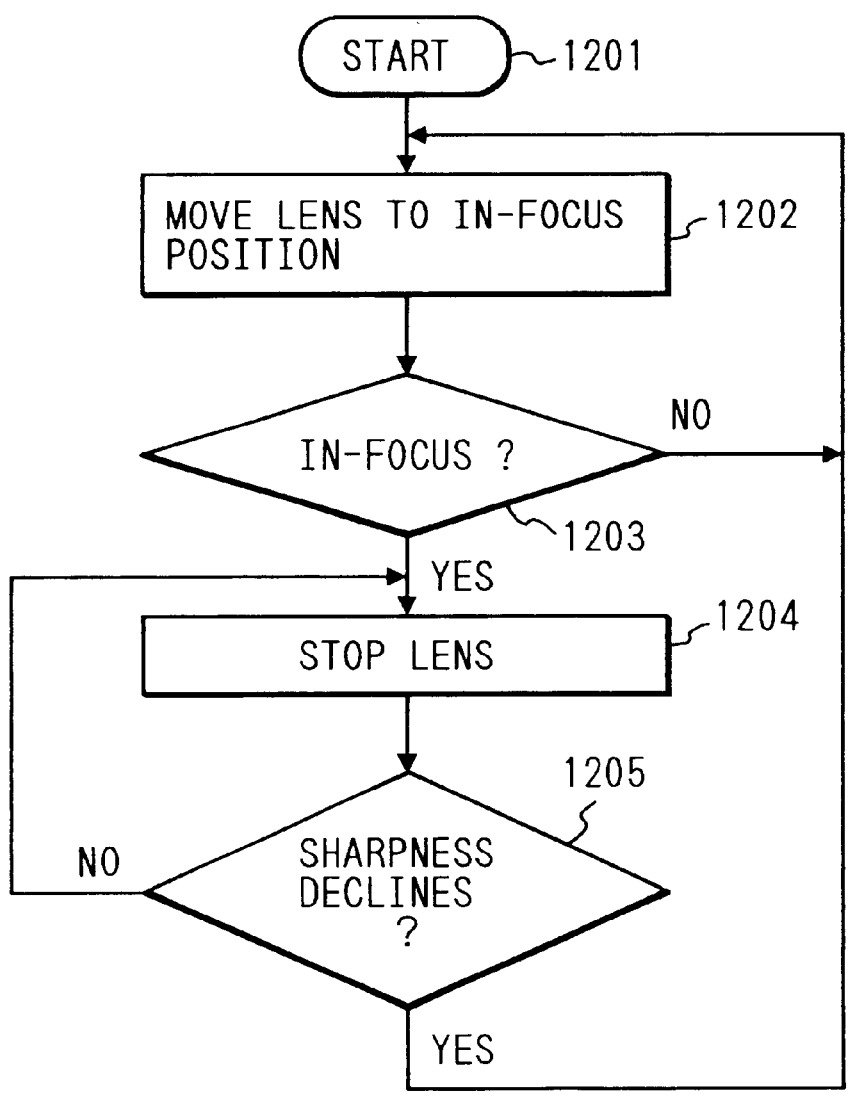
FIG. 12 is a flowchart to show a basic algorithm of the AF operation.

FIG. 12 is a basic flowchart of the focus lens control executed in the AF microcomputer 111.

In FIG. 12, when step 1201 starts execution of control, step 1202 executes an operation of moving the focus lens 103 to a position where the AF evaluation value becomes maximum as described above.

The operation of step 1202 is repeated before the AF evaluation value is determined as maximum at step 1203. If step 1203 determines that the AF evaluation value is maximum, i.e., that the focus lens is in focus, the focus lens is stopped at step 1204.

Step 1205 is a process for monitoring a drop of the level of AF evaluation value, that is, a drop of sharpness of the picture.

If the AF evaluation value maintains the level at that upon stop after the judgment of in-focus and the stop of the focus lens, the processing between step 1205 and step 1204 is repetitively executed, and the focus lens will never start moving.

If step 1205 recognizes a drop of the AF evaluation value, i.e., a drop of sharpness, the processing is returned to step 1202, assuming that the object changes, thereby again going into the operation of moving the focus lens to a position where the AF evaluation value becomes maximum.

Figure 13:
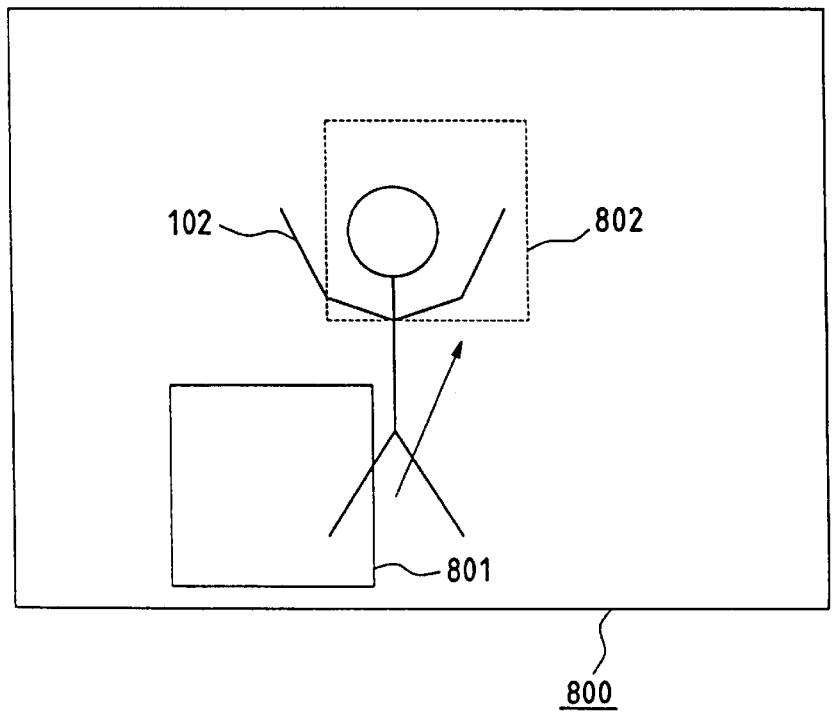
FIG. 13 is a drawing to illustrate an object in a screen and a setting operation of a focus detection area.

As described previously, an advantage of the system for moving the focus detection area 801 as shown in FIG. 13 with position information from the position detecting means is that focus can be made at either one of plural objects at different distances in the image pickup screen without moving the camera.

The AF processing of FIG. 12 can be used also in this case as it is. Namely, because the getting video information changes in accordance with movement of the focus detection area, the lens is automatically restarted with every movement of the focus detection area in the following manner: in-focus and stop of the focus lens; movement of distance measurement frame; change of getting video information; change of evaluation value; transfer of processing from step 1205 to step 1202; restart of the focus lens; in-focus on an object in a new focus detection area, as executed in the named order.

First Embodiment

The above description illustrated the structure as a premise of the camera according to the present invention, and the following description concerns structures as features of the present invention.

The basic system constitution is that as shown in FIG. 4 in which the viewpoint position detecting apparatus 118 is mounted as a position detecting device.

Figures 17, 17A:
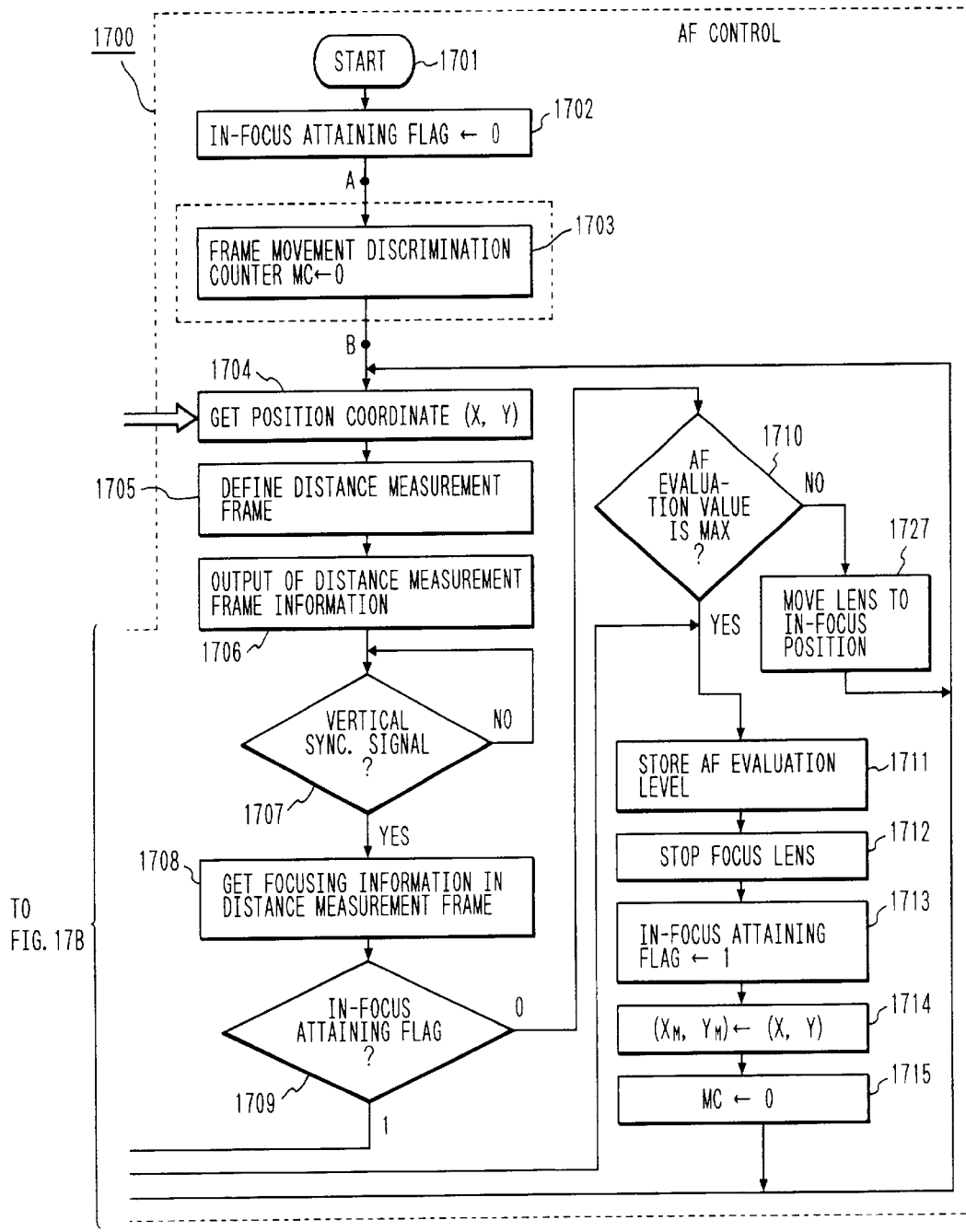
FIG. 17 which is comprised of FIGS. 17A and 17B is a flowchart to illustrate an operation of processing of the first embodiment of the present invention.
Figure 17B:
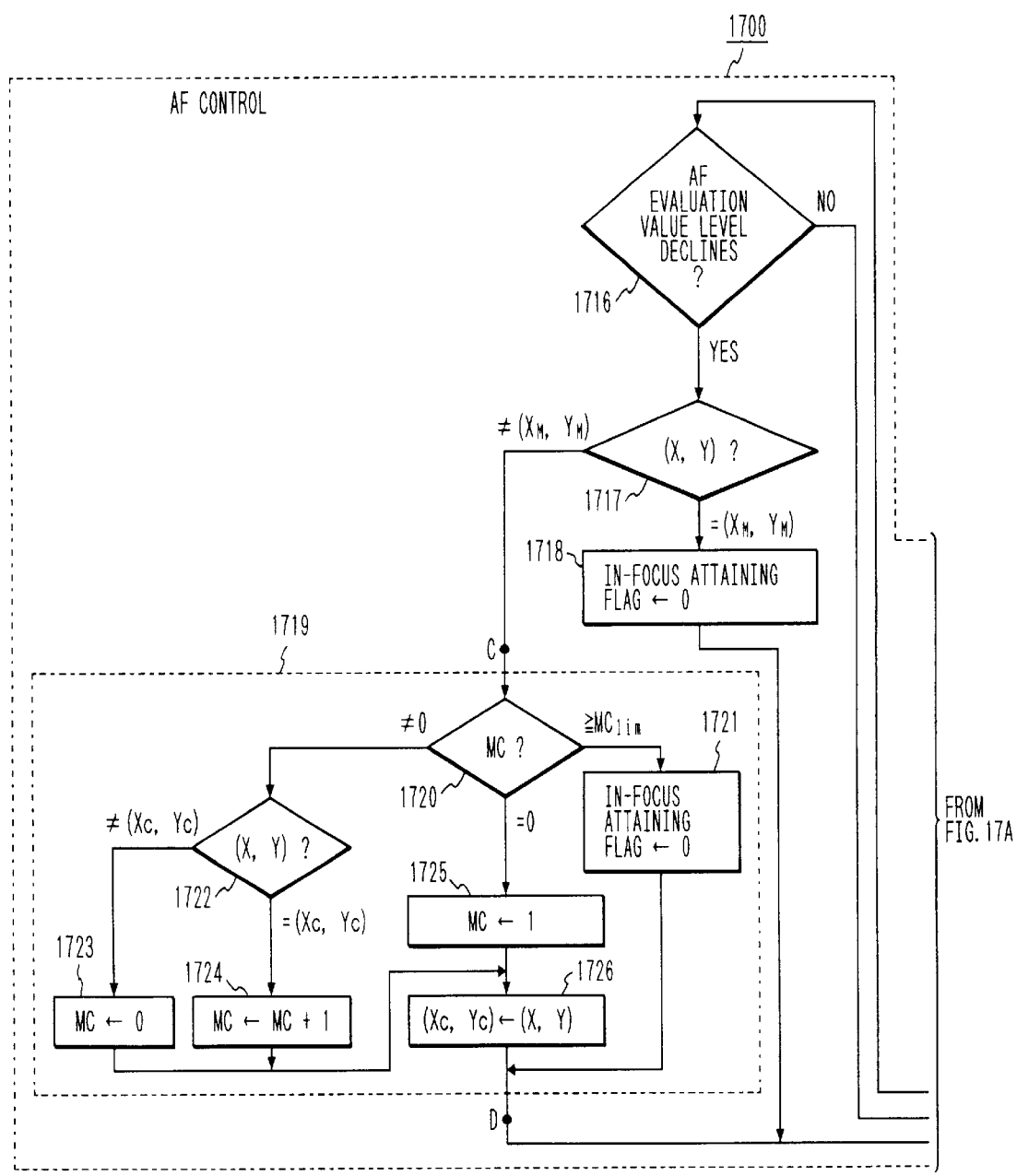

FIGS. 17A and 17B are flowcharts of processing of AF control part 1700 in the camera having the features of the present invention. This processing is carried out in the AF microcomputer 111, which replaces the AF control part 501 in the flowchart of FIG. 5B as described in the system example as the previously described premise.

In FIG. 17A, when step 1701 starts execution of processing, step 1702 and step 1703 clear an in-focus attaining flag and a frame movement discrimination counter MC used later on to 0.

Then step 1704 captures position coordinates (X, Y) from the viewpoint position detection part 500 shown in FIG. 5A. Step 1705 finally determines the focus detection area based on the position coordinates captured, and step 1706 outputs information of the focus detection area (distance measurement frame) to the frame generation circuit 112.

When step 1707 confirms generation of a vertical synchronization signal, step 1708 captures the focus information in the focus detection area (distance measurement frame), and step 1709 bifurcates the processing depending upon a state of the in-focus attaining flag. Initially, the in-focus attaining flag is 0.

Thus, the processing proceeds to step 1710 to determine if the AF evaluation value is maximum as described previously, i.e., if the in-focus state is attained. Unless the AF evaluation value is maximum, step 1727 outputs a command for moving the focus lens 103 so that the AF evaluation value becomes maximum, to the focus lens driver 113. Then the flow returns to the processing of step 1704.

Shortly, the evaluation value is determined as maximum at step 1706, a level of the AF evaluation value is then stored in a memory at step 1711, and the focus lens 103 is stopped at step 1712.

Then the in-focus attaining flag is set to 1 at step 1713, and the position (X, Y) of the viewpoint at the point of in-focus is stored in (XM, YM) at step 1714. This (XM, YM) corresponds to a position of an object on which the photographer desires to focus.

At next step 1715 the frame movement discrimination counter MC is cleared to 0 from the reason as described later, and then the flow returns to the processing of step 1704.

In the next processing the in-focus attaining flag is determined as 1 at 1709, and therefore, after determination at step 1709, the processing proceeds to step 1716 to determine whether the level of AF evaluation value is lowered from the level upon in-focus. A criterion of judgment is the level of AF evaluation value stored at step 1711.

If step 1716 finds no change in the AF evaluation value at all, because the in-focus state should be maintained as it is, the processing moves to step 1711 to keep the in-focus state.

The drop of AF evaluation value will not occur only when a state of an object located at the position of (XM, YM) actually changes, but also when the focus detection area (distance measurement frame) moves to capture video information in another region.

When the state of the object actually changes, the focusing operation should be quickly restarted; but when the focus detection area (distance measurement frame) moves, the AF operation should not be indiscriminately restarted because it is highly possible that the photographer desires just to check the image pickup screen.

Thus, once step 1716 confirms a drop of AF evaluation value, step 1717 checks whether the focus detection area (distance measurement frame) moved by comparing a current viewpoint position (X, Y) with the position coordinates (XM, YM) of the focus detection area upon in-focus.

If (XM, YM)=(X, Y), that is, if the focus detection area did not move, the in-focus attaining flag is set to 0 at step 1718, and the AF operation is restarted by the next processing from step 1704.

If the focus detection area moved, because the viewpoint would conceivably return to the original object position, a processing block of step 1719 counts a predetermined time; if the photographer continues watching another portion over the predetermined time then the AF operation is restarted with information in a new focus detection area.

If step 1717 confirms a drop of the AF evaluation value level because of movement of the focus detection area, the processing proceeds to step 1720 in the processing block of step 1719.

Step 1720 splits the processing depending upon the value of frame movement discrimination counter MC initially cleared to 0. Since MC is initially 0, 1 is put into MC at step 1725, position coordinates (X, Y) of a current focus detection area are stored in (XC, YC) at step 1726, and the processing returns to step 1704.

After focus has been made, if the focus detection area moves from the position of the focus detection area upon in-focus so as to keep the AF evaluation value as lowered, the processing block of step 1719 is executed as a consequence of judgment at step 1717.

Since the frame movement discrimination counter MC is already set to 1, the processing advances from step 1720 to step 1722 to compare a current viewpoint detection position (X, Y) with the position coordinates (XC, YC) of the focus detection area stored at a previous time.

This comparison is for discriminating a case where the photographer desires to change the distance measurement point from a case where the photographer just gives a glance at the portion. If the photographer desires to change the distance measurement point, the photographer would continue looking at the position to be changed.

Thus, only if the current viewpoint detection position coordinates (X, Y) are equal to the position coordinates (XC, YC) of the previous focus detection area in the comparison at step 1722, the frame movement discrimination counter MC is given an increment at 1724; then, if MC reaches a predetermined value, the processing moves to the AF operation, determining that the photographer clearly continues looking at a same point.

If step 1722 determines that (X, Y) is not equal to (XC, YC), it is judged that the photographer is looking around some portions in the screen; thus, the counter MC for determination of continuous looking is cleared to 0 at step 1723, new (X, Y) is put into (XC, YC) at step 1726, and the flow returns to the processing of step 1704.

When MC reaches a predetermined value MClim at step 1720 in this manner, it is determined that the photographer surely continues looking at a different point from that upon in-focus; then the in-focus attaining flag is cleared to 0 at step 1721, and the flow returns to step 1704 to restart the AF operation from the next processing.

If the focus detection area returns to the position of (XM, YM) on the way of giving an increment to the frame movement discrimination counter MC in the processing block of step 1719 to return the AF evaluation value to the original value, the processing transfers from step 1716 again to step 1711 to continue maintaining the in-focus state.

However, in this case, because MC is set to a value other than 0, step 1715 clears MC to 0 in order to prepare for a next occasion of movement of the focus detection area.

Execution of the above processing makes it possible to determine if a drop of evaluation value is due to a change of the object or movement of focus detection area after focus is made and to suspend restart of the AF operation for a predetermined time in case of the drop of the AF evaluation value due to movement of the focus detection area.

Proper selection of the predetermined time permits the apparatus to be arranged in such a manner that the AF operation is not restarted when the photographer just checks the configuration etc. as looking at another position in the image pickup screen after focus is made, but the AF operation is restarted only when the photographer selects another object and continues looking at the object.

The above description showed the example including the processing of step 1717, step 1722, etc. in FIG. 17B where the comparison of coordinates was based on a "point," that is, whether both X coordinate and Y coordinate are equal or not, but instead of the judgment of "whether equal or not," the present invention also includes cases where "whether the photographer is looking at a same object" is determined by setting a certain range and determining whether X and Y are included in the range.

Second Embodiment

Figure 18B:
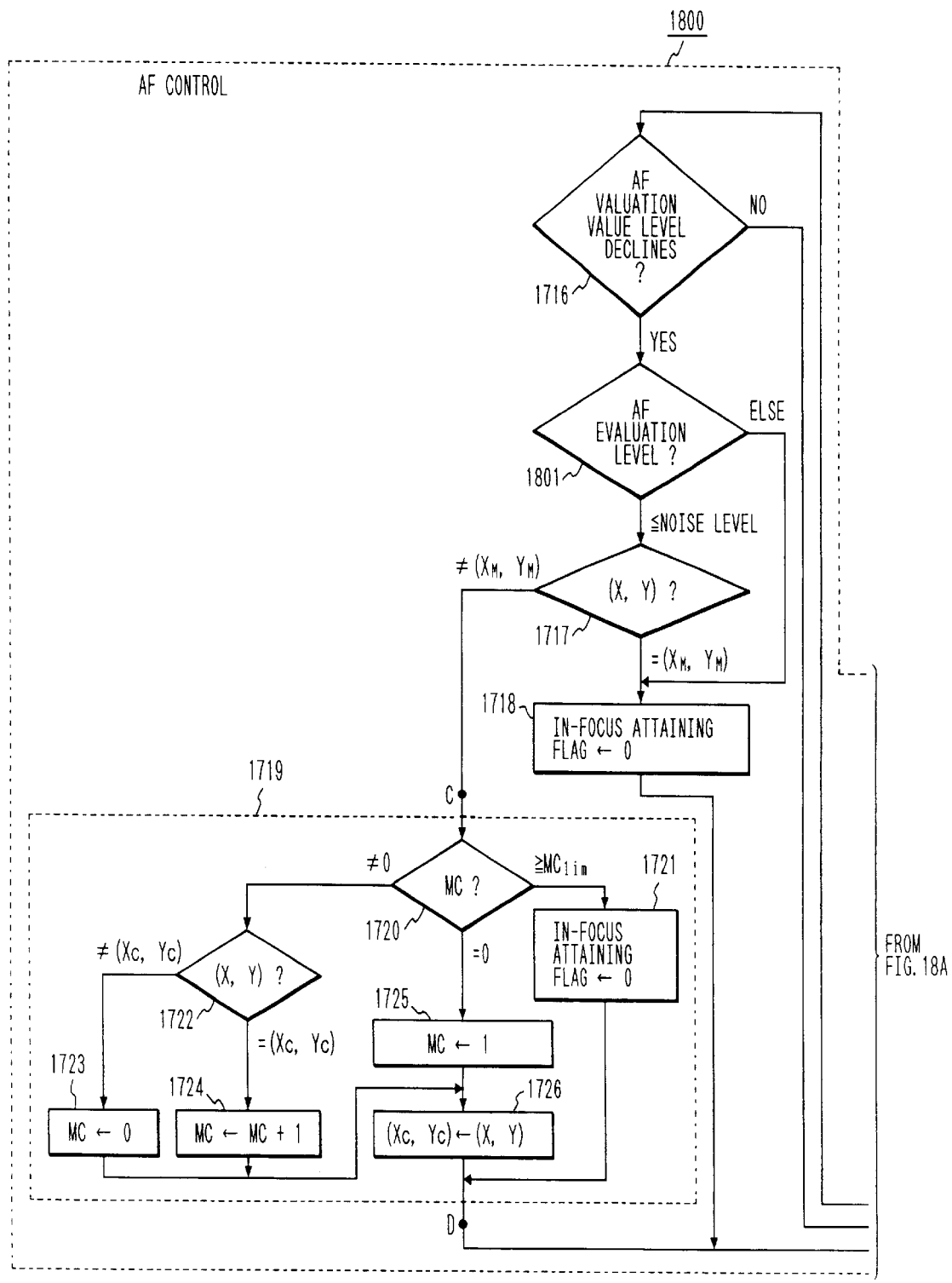
FIG. 18 which is comprised of FIGS. 18A and 18B is a flowchart to illustrate an operation of processing of the second embodiment of the present invention.

The second embodiment of the present invention is next described. FIGS. 18A and 18B show another processing example of the AF processing executed in the AF microcomputer 111 and is a flowchart of processing of AF control part 1800 in a camera.

The structure of a system described in the present embodiment is substantially the same as that shown in FIG. 4 in which the viewpoint position detecting apparatus 118 is mounted as a position detecting device.

Accordingly, the processing of FIGS. 18A and 18B are executed in the AF microcomputer 111, and replaces the AF control part 501 in the flowchart of FIGS. 5A and 5B as described previously as the premise of the present invention.

Since the flow of processing in FIGS. 18A and 18B are basically the same as that in FIGS. 17A and 17B, steps for performing the same processes will be denoted by the same reference numerals as those in FIGS. 17A and 17B. A difference of the processing of FIGS. 18A and 18B from the processing of FIGS. 17A and 17B is that step 1801 for determining if the AF evaluation value is not more than the noise level is provided between step 1716 for determining the drop of AF evaluation value level and block 1717 for detecting a change of the viewpoint position. The noise level is one as shown in FIG. 11, which represents a level of noise etc. overlaid on an analog video signal in the transmission path of from CCD 104 to the A/D conversion in the AF microcomputer 111.

If an object with super-low contrast is taken, even an AF evaluation value at the in-focus point becomes so small as to be buried in the noise level. In such cases, it becomes practically impossible to accurately detect the maximum point of the AF evaluation value, which would result in an unwanted behavior of the lens such as hunting so as to fail to stop or stopping at an erroneous position because of the noise.

The present embodiment is so arranged that if after in-focus the focus detection area (distance measurement frame) moves to capture a super-low-contrast object as described above in the entire focus detection area (distance measurement frame), the timer processing routine 1719 in FIG. 17B as described in the first embodiment is started so as to prevent the erroneous operation of the lens and to restart the AF operation quickly, mainly taking account of responsivity, for focus-possible objects other than the super-low-contrast object.

The processing of FIGS. 18A and 18B are described in the following, focusing on the different part from FIGS. 17A and 17B.

When step 1716 confirms a drop of level of AF evaluation value after focus is once made, step 1801 determines whether the AF evaluation value level is not more than the noise level.

If the AF evaluation value is greater than the noise level, a possibility is high of obtaining a new in-focus point by restarting the AF operation; thus, the in-focus attaining flag is set to 0 at 1718 irrespective of presence or absence of the movement of distance measurement frame, thereby restarting the AF operation from the next processing.

If the AF evaluation value is not more than the noise level, the timer processing routine 1719 is used. If the photographer continues looking at a new position over a predetermined time, the AF operation is restarted as determining that the photographer must have selected that portion as a next main object.

Third Embodiment

Figure 19B:
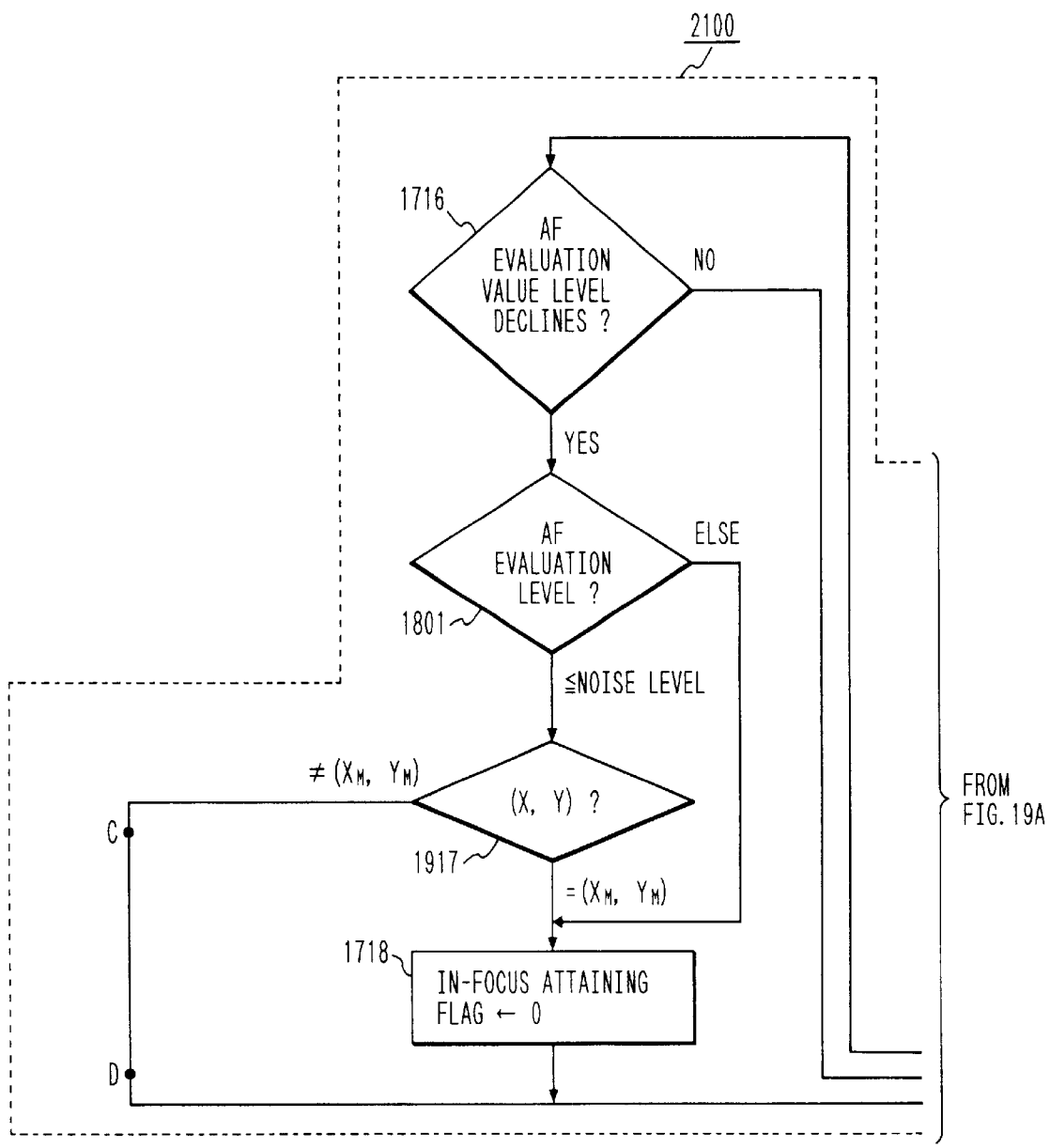
FIG. 19 which is comprised of FIGS. 19A and 19B is a flowchart to illustrate an operation of processing of the third embodiment of the present invention.

Incidentally, it is also possible that the AF operation is never restarted when the photographer looks at a super-low-contrast object after in-focus, without executing the processing block of step 1703 and the processing of timer processing routine 1719 in the flowchart of FIGS. 18A and 18B and thus with bridging between A and B and between C and D as in FIGS. 19A and 19B. Since the autofocusing is practically impossible in taking the super-low-contrast object, the AF control part 2100 for performing the processing as shown in the flowchart of FIGS. 19A and 19B can be said as practical.

Execution of the above processing makes possible such an operation that it is determined whether a drop of evaluation value after in-focus is due to a change of the object or movement of the focus detection area (distance measurement frame) and that the restart of the AF operation is suspended for a predetermined time or is not restarted at all if the possibility of in-focus is very low with restart of AF when the focus detection area (distance measurement frame) moves to capture another object. Further, it is also possible to restart AF quickly with determination of high possibility of in-focus.

FIGS. 18A to 19B also employ the arrangement that the comparison of coordinates at step 1717 or step 1722 is made based on a "point," i.e., a determination of whether both the X coordinate and Y coordinate are equal or not is carried out, but instead of the determination of "whether equal or not," the determination of "whether the photographer is looking at a same object" may be done by setting a certain range and determining if X and Y are within the range.

Fourth Embodiment

Figure 20A:
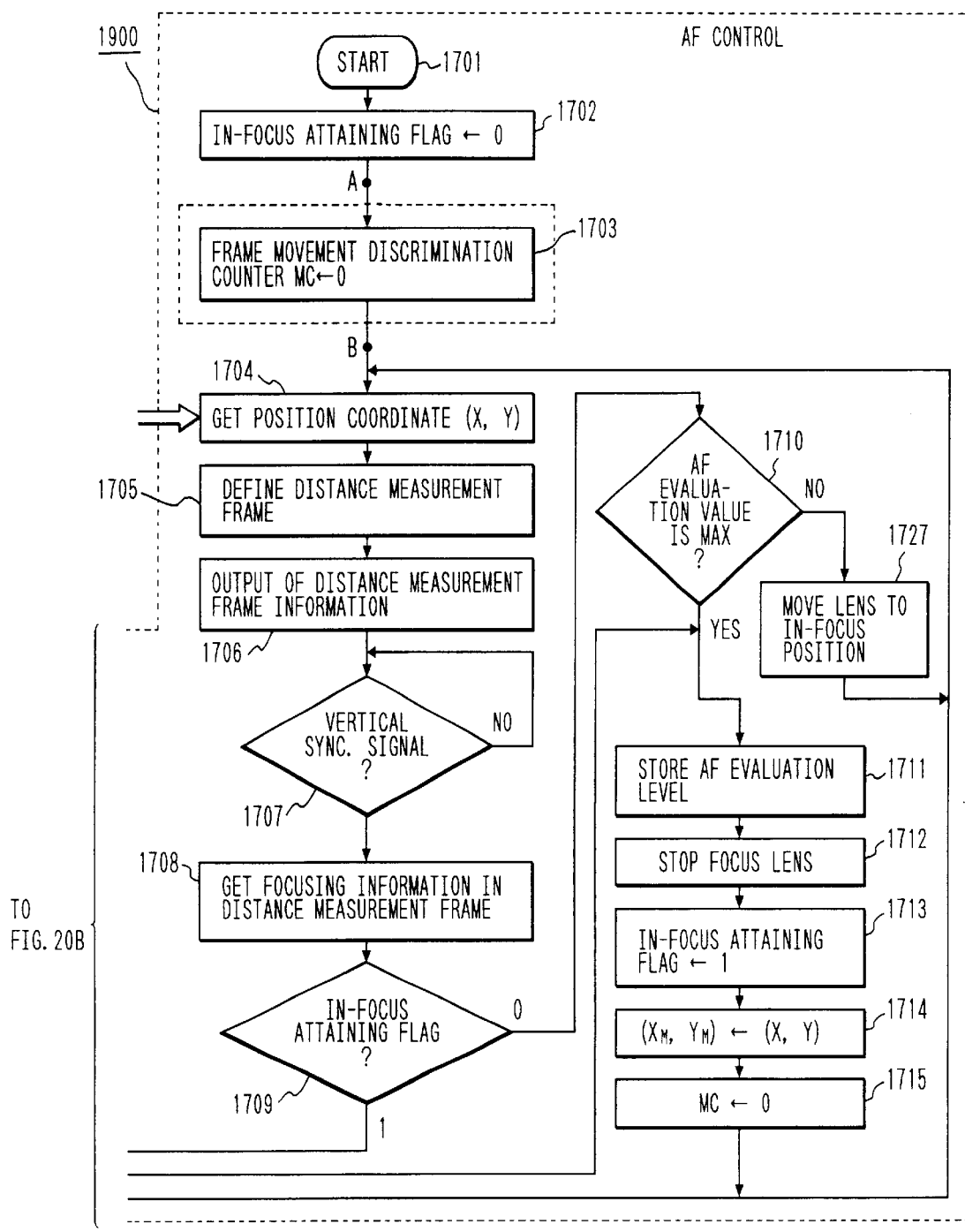
FIG. 20 which is comprised of FIGS. 20A and 20B is a flowchart to illustrate an operation of processing of the fourth embodiment of the present invention.
Figure 20B:
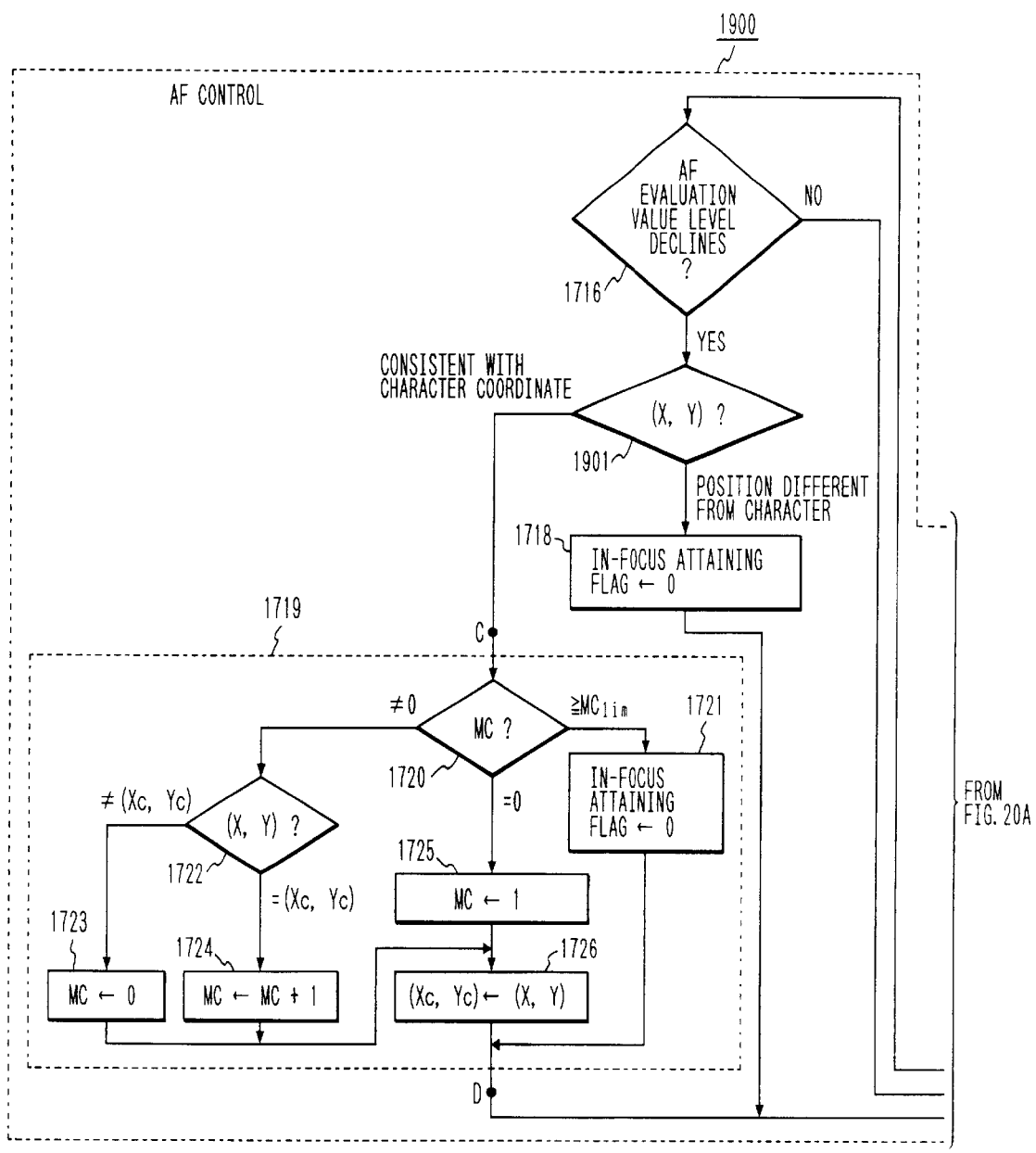

The fourth embodiment of the present invention is next described. FIGS. 20A and 20B show another processing example of the AF processing executed in the AF microcomputer 111 and is a flowchart of processing of AF control part 1900 in the camera.

The structure of a system described in the present embodiment is substantially the same as that shown in FIG. 4 in which the viewpoint position detecting apparatus 118 is mounted as a position detecting device.

Accordingly, the processing of FIGS. 20A and 20B are executed in the AF microcomputer 111, which replaces the AF control part 501 in the flowchart of FIGS. 5A and 5B as described previously as the premise of the present invention.

The flow of processing of FIGS. 20A and 20B are basically the same as that of FIGS. 17A and 17B. A difference of the processing of FIGS. 20A and 20B from that of FIGS. 17A and 17B are as follows.

Namely, after recognizing a drop of the AF evaluation value, FIGS. 17A and 17B are so arranged that step 1717 determines whether the position of the current focus detection area (distance measurement frame) is different from the position of the focus detection area (distance measurement frame) at the in-focus point, whereas FIGS. 20A and 20B are so arranged that instead of the judging process of step 1717 in FIG. 17B, step 1901 determines whether a current viewpoint position is the same as a character position displayed on the monitor in the finder.

Figure 14A:
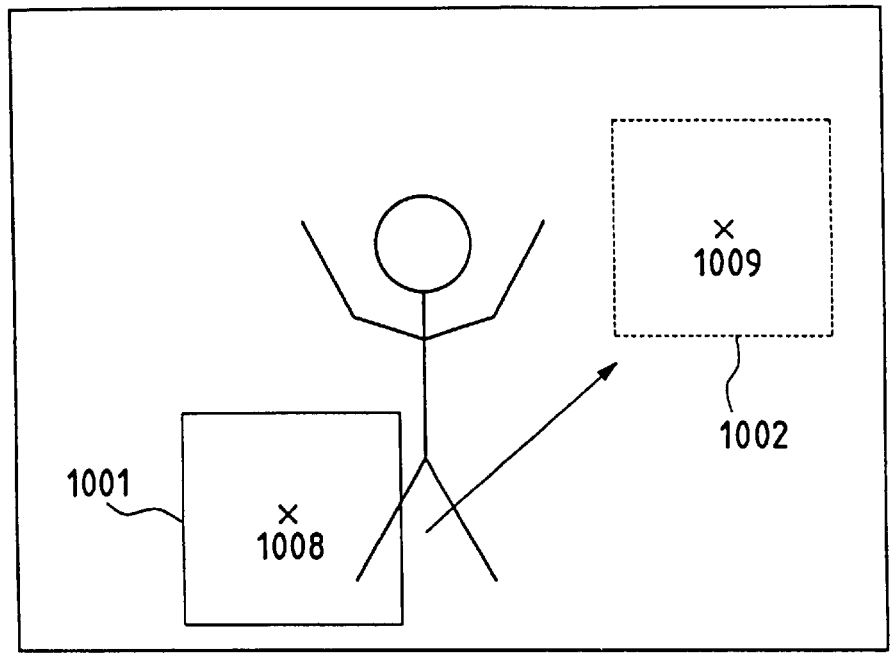
FIGS. 14A and 14B are drawings to illustrate an object in a screen and a setting operation of a focus detection area.
Figure 14B:
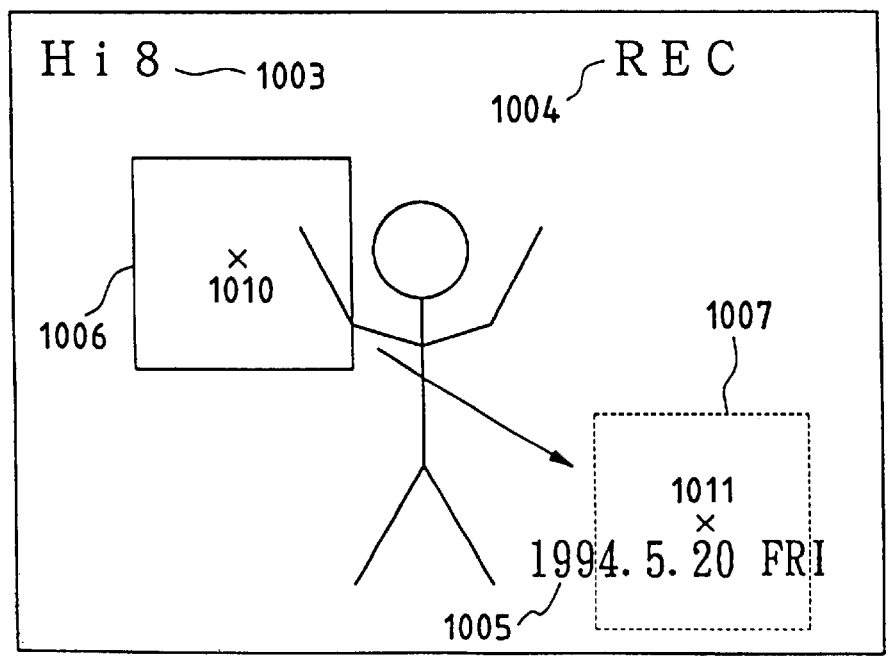

Namely, the AF operation is not restarted by such a simple occasion that the photographer just gives a glance at the character indications as shown in FIG. 14B during photography to check the conditions of camera.

Figure 15:
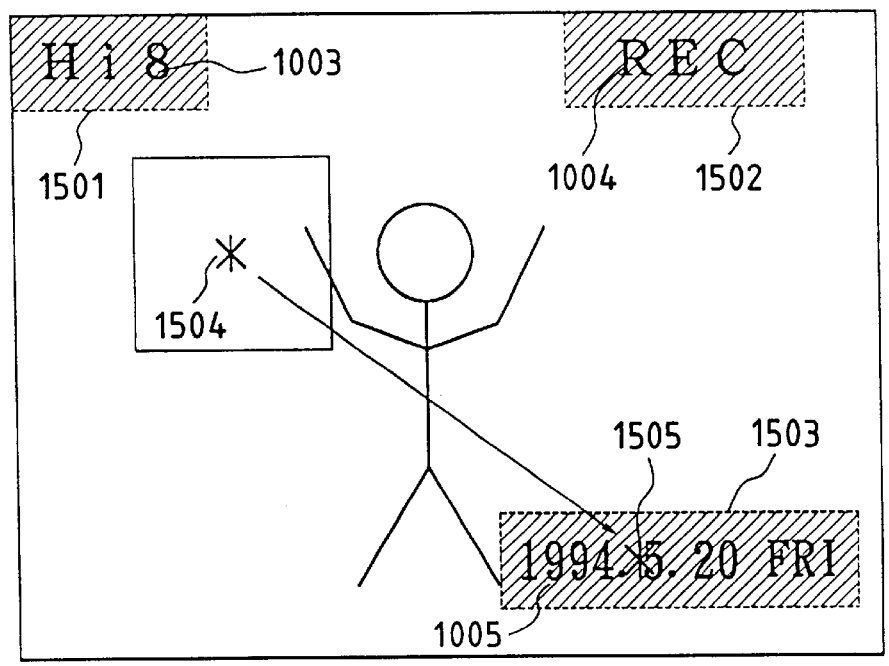
FIG. 15 is a drawing to illustrate an object in a screen and a setting operation of a focus detection area.

Since positions of the characters are preliminarily determined in normal cases, the positions of indications of characters, that is, viewpoint positions where the photographer is looking at the characters, are preliminarily determined as regions, for example as shown by regions 1501, 1502, 1503 in FIG. 15, and restart of the AF operation is suspended when viewpoint coordinates coincide with coordinates in one of the regions, for example in case of a motion of the viewpoint from the viewpoint position 1504 to the viewpoint position 1505.

The processing of the flowchart of FIGS. 20A and 20B is next described, focusing on the different portion from FIGS. 17A and 17B.

When step 1716 confirms that the level of AF evaluation value has dropped after in-focus, step 1901 determines whether or not the viewpoint position (X, Y) is within the character indication areas shown in FIG. 15.

If the viewpoint position is not within the character areas at step 1901, the in-focus attaining flag is set to 0 at step 1718 to restart the AF operation from the next processing. If step 1901 determines that (X, Y) is within one of the character indication areas, the processing of timer processing routine 1719 is executed; then, if the photographer continues looking at that portion over the predetermined time, the in-focus attaining flag is set to 0 at step 1721, assuming that the photographer selected an object there as a main object, thereby restarting the AF operation from the next processing. If the viewpoint position changes before the predetermined time elapses, the AF operation is not restarted.

Execution of the above processing makes it possible to suspend restart of the AF operation for the predetermined time if the evaluation value drops after in-focus and if the photographer is regarded as looking at characters displayed as superimposed on the monitor in the finder.

FIGS. 20A and 20B also employ the comparison of coordinates at step 1722 based on a "point," that is, the judgment of whether both the X coordinate and the Y coordinate are equal or not, but instead of the judgment of "whether equal or not," the judgment of "whether the photographer is looking at a same object" may be made by setting a certain range and determining if X and Y are within the range.

Fifth Embodiment

Figure 21B:
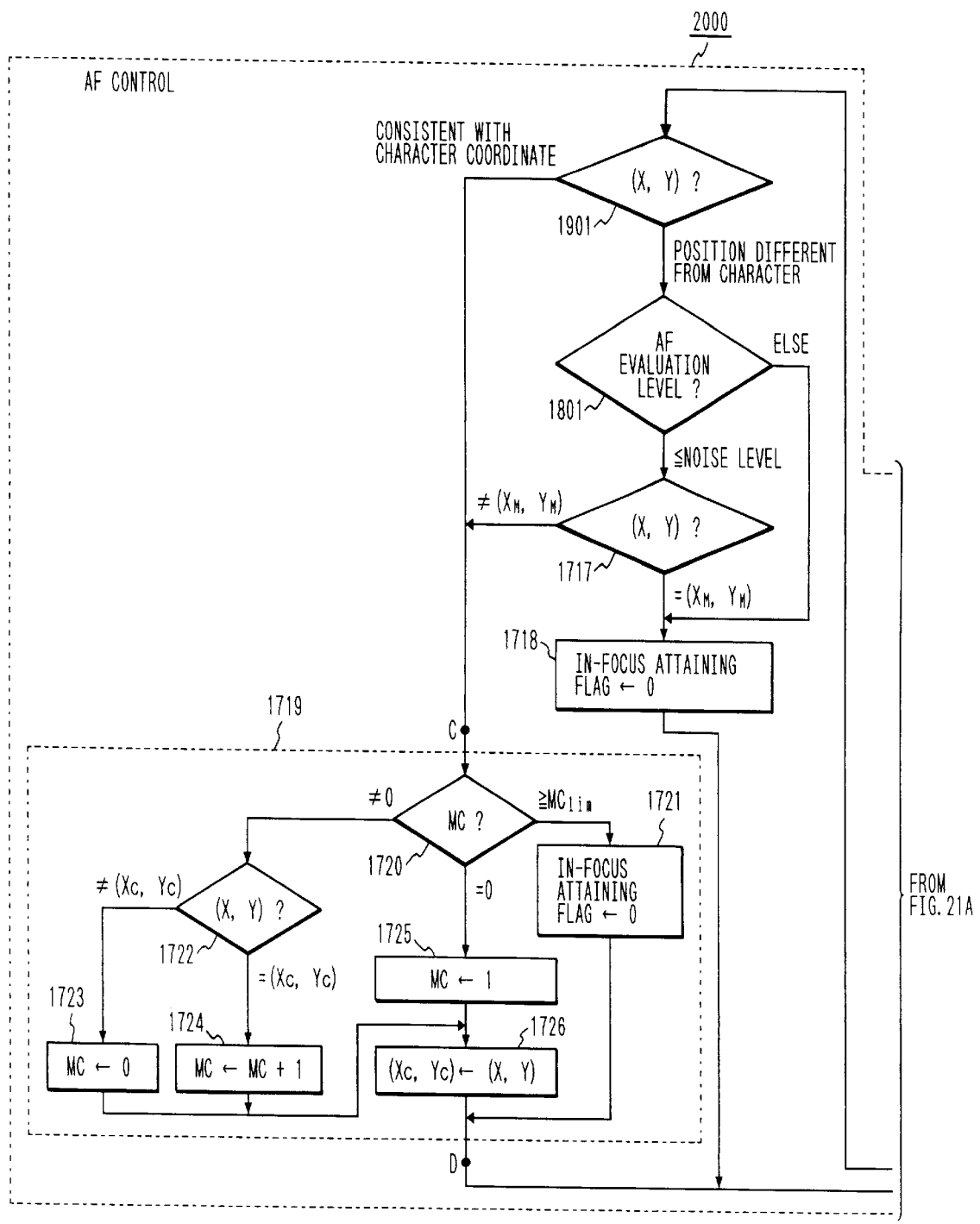
FIG. 21 which is comprised of FIGS. 21A and 21B is a flowchart to illustrate an operation of processing of the fifth embodiment of the present invention.

The fifth embodiment of the present invention is next described. FIGS. 21A and 21B show another processing example of the AF processing executed in the AF microcomputer 111, and is a flowchart of processing of AF control part 2000 in the camera.

The structure of a system described in the present embodiment is substantially the same as that shown in FIG. 4 in which the viewpoint position detecting apparatus 118 is mounted as a position detecting device.

Accordingly, the processing of FIGS. 21A and 21B are executed in the AF microcomputer 111, which replaces the AF control part 501 in the flowchart of FIGS. 5A and 5B as described previously as a feature of the present invention.

Figure 16:
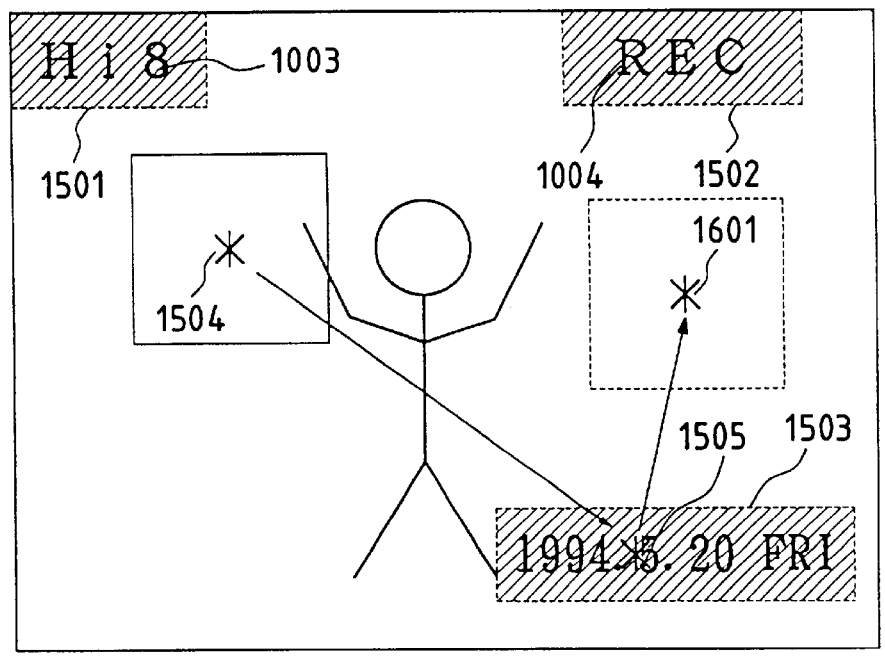
FIG. 16 is a drawing to illustrate an object in a screen and a setting operation of a focus detection area.

The processing of FIGS. 21A and 21B are includes both the processing of FIGS. 18A and 18B and the processing of FIGS. 20A and 20B, which is effective to cases where the photographer moves the viewpoint from the viewpoint position 1504 to the viewpoint position 1505 in FIG. 16 and then moves the viewpoint to a portion of position 1601 with no contrast at all. It is described below with reference numerals corresponding to those in the flowcharts of FIGS. 18A, 18B, 20A and 20B.

After a drop of the AF evaluation value is recognized, step 1901 determines whether a current viewpoint position is coincident with the character positions displayed on the monitor in the finder.

If it is judged that the photographer is looking at the characters, the timer processing routine of step 1719 is executed as in the processing of FIGS. 19A and 19B.

If it is judged that the photographer is not looking at the characters, step 1801 judges whether the AF evaluation value is not more than the noise level. If the AF evaluation value is lower than the noise level and if the viewpoint position is changed from that upon in-focus, the timer processing routine 1719 is used.

When the photographer is looking at characters or a super-low-contrast object, the processing is arranged to avoid quick restart of the AF operation.

FIGS. 21A and 21B are described below, avoiding redundancy with the previous description.

When step 1716 confirms that the level of AF evaluation value is lowered after focus is once made, step 1901 determines whether the viewpoint position (X, Y) is within the character indication areas shown in FIG. 15.

If the viewpoint position is not in the character areas at step 1901, step 1801 determines whether the AF evaluation value level is not more than the noise level. If it is higher than the noise level, because a possibility of in-focus is high with restart of the AF operation, the in-focus attaining flag is set to 0 at step 1718, thereby restarting the AF operation from the next processing.

If the AF evaluation value is not more than the noise level, step 1717 determines whether the viewpoint position is changed from that upon in-focus. If it is moved, the timer processing routine 1719 is used to avoid quick restart of the AF operation. If the AF evaluation value drops without a change of the viewpoint position from that upon in-focus, the in-focus attaining flag is set to 0 at step 1721, assuming that the object changes, thereby restarting the AF operation from the next processing.

If step 1901 judges that (X, Y) is within the character indication areas, the timer processing routine of step 1719 is used; if the photographer continues looking at that position over the predetermined time, judging that the photographer selected an object there as a main object, the in-focus attaining flag is set to 0 at step 1721, thereby restarting the AF operation from the next processing. The AF operation is not restarted for example in cases where the viewpoint position changes before the predetermined time elapses.

Execution of the above processing makes possible such an operation that if the evaluation value drops after in-focus and if it is determined that the photographer is looking at the characters displayed as superimposed on the monitor in the finder, restart of the AF operation is suspended for the predetermined time; if the photographer looks at a position different from the characters and if the photographer is not looking at a super-low-contrast object, the AF operation is immediately restarted to secure the responsivity; if the photographer is looking at a super-low-contrast object, restart of the AF operation is suspended for a while.

Sixth Embodiment

Incidentally, if (X, Y) is not equal to (XM, YM) at 1717 in FIG. 21B, the processing may be returned to step 1704 as shown in FIG. 22A without transferring the processing from step 1717 to the timer processing routine 1719, whereby the lens can be kept stationary when the entire area in the distance measurement frame has a super-low contrast.

Figure 22B:
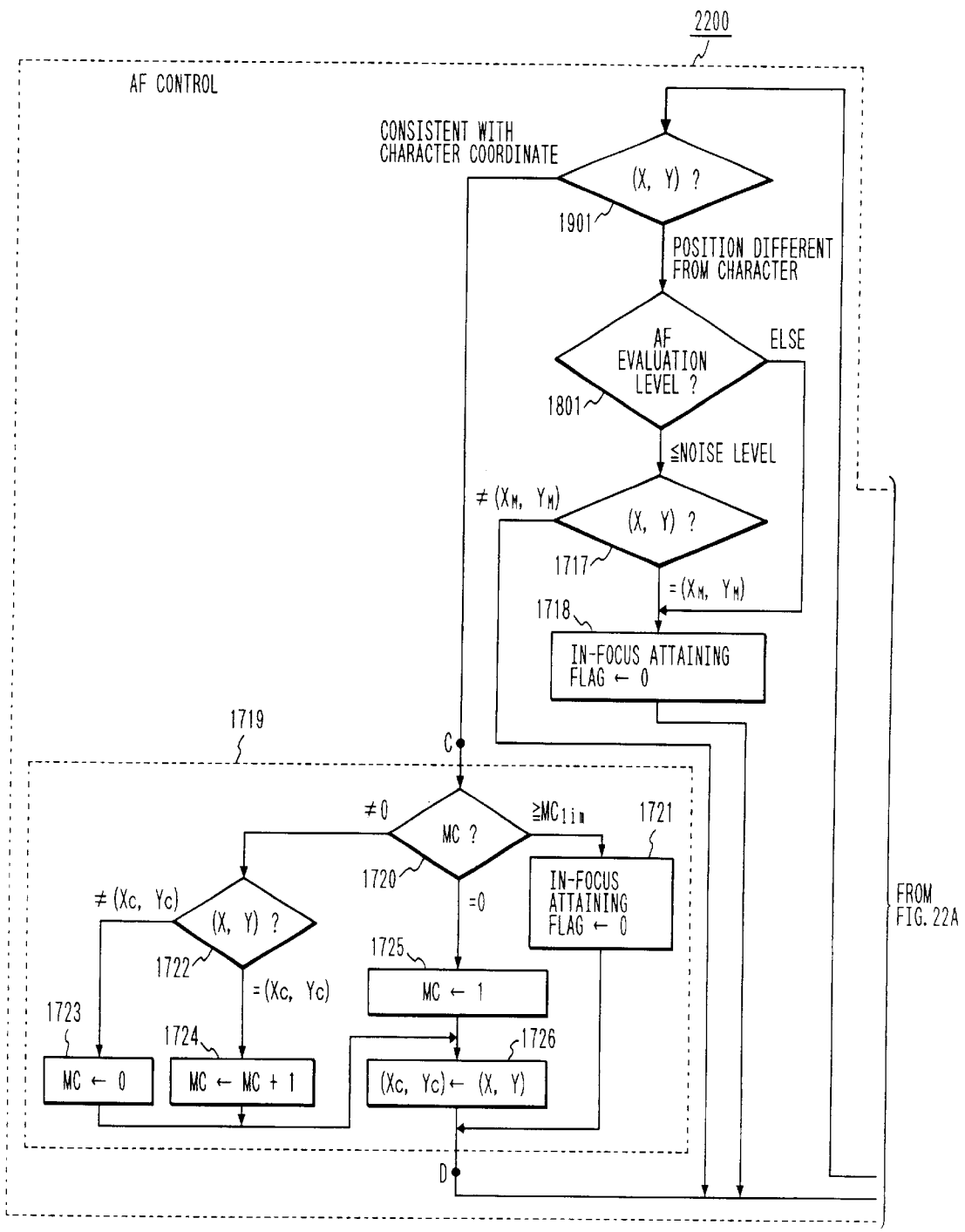
FIG. 22 which is comprised of FIGS. 22A and 22B is a flowchart to illustrate an operation of processing of the sixth embodiment of the present invention.

Since autofocusing is practically impossible in taking the super-low-contrast object, the AF control part 2200 for performing the processing of the flowchart as shown in FIGS. 22A and 22B can be said as practical.

FIGS. 21A to 22B also employ the comparison of coordinates at step 1717 or at step 1722 based on a "point," that is, the judgment of whether both the X coordinate and the Y coordinate are equal or not, but instead of the judgment of "whether equal or not," the judgment of "whether the photographer is looking at a same object" may be made by setting a certain range and determining whether X and Y are within the range.

The above description showed five embodiments to illustrate the flows of processing 1700, 1800, 1900, 2000, 2100, 2200 as a substitute of the AF control part 501 in FIG. 5B in the system using the viewpoint position detecting apparatus.

Then these AF control parts can replace the AF control part 1301 in FIG. 8 or the AF control part 1401 in FIG. 10B as they are, in systems using a position detecting device different from the viewpoint position detecting apparatus shown in FIG. 6, whereby it is apparent that the concept of the present invention is not applied only to the systems including the viewpoint position detecting apparatus.

From a systems need, there are cases necessitating preliminary addition of initial coordinate setting processing, for example such as processing of from step 1419 through step 1420 to step 1421, before the vertical synchronization signal wait step 1707 in actual applications. However, because omission of the initial coordinate setting process does not cause any insufficiency for the embodiments of the present invention, presentation of flowcharts with addition is omitted herein.

Figure 23A:
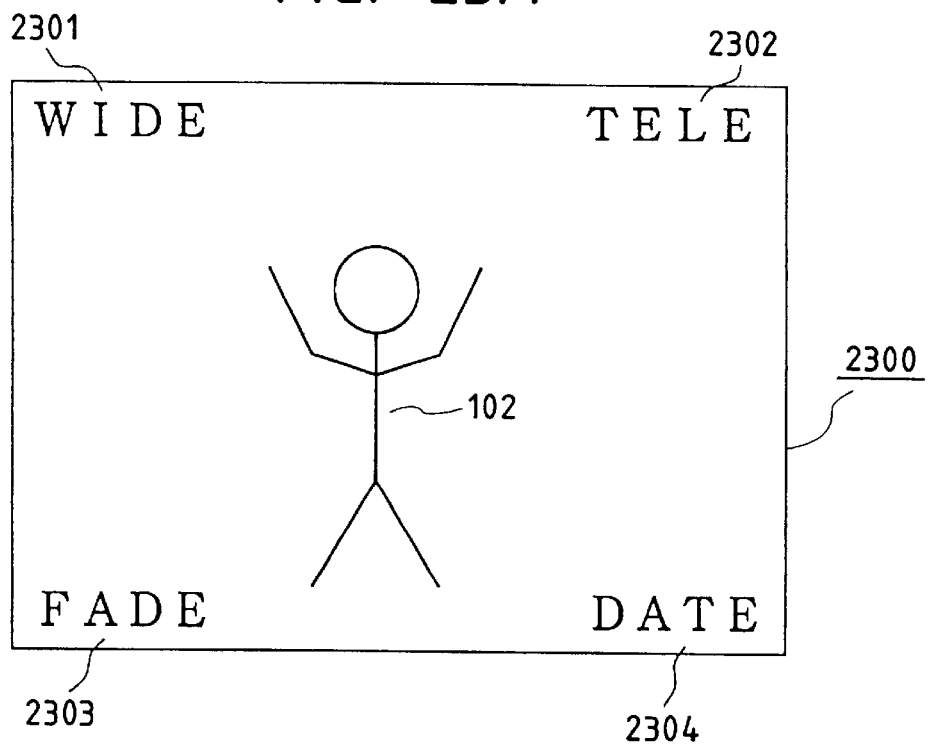
FIGS. 23A and 23B are drawings to illustrate display and operation of switches in a finder.
Figure 23B:
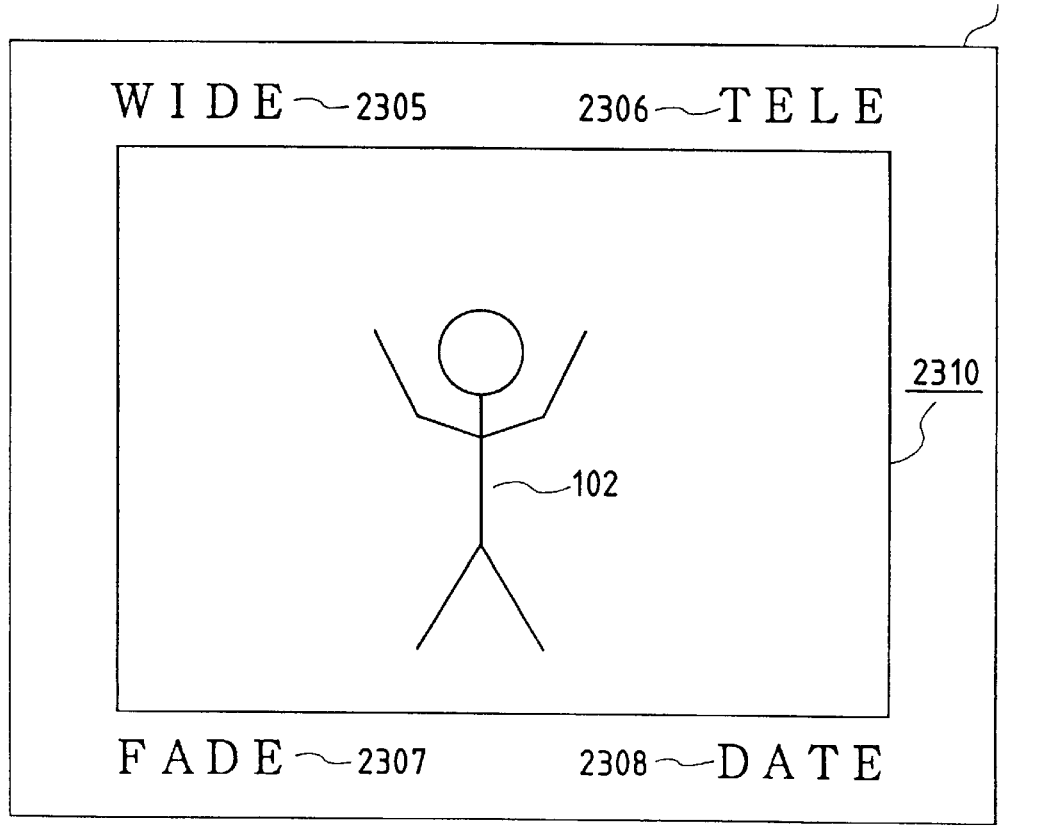

FIGS. 23A and 23B show an example of display of the switch functions in the finder. In the drawings, 2301 and 2305, 2302 and 2306, 2303 and 2307, 2304 and 2308 represent character indication portions of switches for zooming to the tele side, zooming to the wide side, on-off of fade, and on-off of date indication, respectively. Each function is made effective by moving the position detecting device to either portion and pressing an unrepresented switch such as a click switch.

Since there is only one position detecting device and when the position detecting device is moved to manipulate such switch functions, the motion would become unstable if AF operates on each occasion of moving the position detecting device.

Substitution of the AF control part 1900, 2000, 2200 in FIGS. 20A and 20B, FIGS. 21A and 21B, or FIGS. 22A and 22B with the AF control part 1301 in FIG. 8 or the AF control part 1401 in FIG. 10B are especially effective to systems indicating the switch functions in the finder as in FIGS. 23A, 23B. Such substitution can achieve the same effect as that upon the photographer's looking at the character indications.

Further, the above description of the embodiments was based on such a basic arrangement that when the photographer looks at a low-contrast object or characters, the timer processing routine of step 1719 is used to suspend restart of the AF operation for the predetermined time and thereafter the AF operation is restarted. This is AF non-performing and escaping means employed from the concept that the autofocus operation is to be executed for a point where the photographer watched or designated.

Although the above description concerned the second and fifth embodiments, the first and fourth embodiments may be so arranged that without executing step 1703 and the timer processing routine 1719 the processing is arranged to bridge the processing between A and B and between C and D to obviate the escape of the AF non-performing operation by timer, and that when the observer looks at characters or a low-contrast object, the lens is kept not moving at all.

Since the embodiments of the present invention as described above are so arranged that adjustment of focus lens position is inhibited when the range for capturing the video state detection signal is changed, the embodiments have such an advantage that even if the change of the range for capturing the video state detection signal causes a change of object image so as to result in changing the video state detection signal, if it is a short-time change, the focus lens is kept not restarting, thereby enabling the stable AF operation without a malfunction.

Also, even if a motion including instability of selecting means causes a change of the portion for capturing the video state detection signal, immediate movement of the focus lens is suspended, thereby preventing a malfunction of the AF control and improving the stability.

Also, even if an unstable movement element is included upon selecting an object to move the focus detection area, execution of the AF operation is suspended before a destination of movement is fixed, thereby securing stable behavior of the focus lens.

Since the embodiments of the present invention are so arranged that the period for inhibiting the adjustment of the focus lens position by the controlling means is limited to a predetermined time, the inhibition time of the drive of the focus lens can be kept not unnecessarily long, and the response performance of the AF control can be secured. Further, the photographer can avoid an operation against the AF, e.g., a state of the focus lens not moving at all.

Since the embodiments of the present invention are so arranged that the above range is located at the viewpoint detection position detected by the viewpoint detecting means for detecting the viewpoint position of the photographer, the embodiments can enjoy such advantages that the range for capturing the video state detection signal can be changed by the viewpoint position, thereby considerably improving the operability and that even if the input means is so unstable as to easily cause detection errors due to variations of viewpoint position, photographer's looking aside, blinks, etc., if the change is short in time, the stable AF operation can be realized without a malfunction of the AF.

Since the embodiments of the present invention are so arranged that the above range is located at a position designated by an external input device such as a mouse or a joy stick, the embodiments have such an advantage that even if the portion for capturing the video state detection signal changes due to a motion including the instability of selecting means, immediate movement of the focus lens is suspended to prevent a malfunction of AF control, thereby improving the stability.

Since the embodiments of the present invention are so arranged that when the range for capturing the video state detection signal is changed and if the video state detection signal does not satisfy the predetermined condition, adjustment of the focus lens position is inhibited for a predetermined time, the embodiments have such an advantage that even if AF is impossible upon the change of the range for capturing the video state detection signal, if it is within a certain predetermined time, the focus lens is kept not restarting, whereby the stable AF operation can be performed without a malfunction.

Also, even if the video state detection signal is improper when the portion for capturing the video state detection signal changes due to a motion including the instability of the selecting means, immediate movement of the focus lens is suspended to prevent a malfunction of the AF control, thereby improving the stability.

Also, the inhibition of the adjusting operation of the focus lens can be applied for example to low-contrast objects etc. Even if an AF-incapable object such as a low-contrast object is selected by the selecting means, a malfunction of the AF control can be prevented and the response performance can be secured for objects with which AF can achieve focus.

Further, if it is expected that a malfunction will occur in a motion of the focus lens depending upon conditions of an object at a moving destination, execution of the AF operation is inhibited or the operation of AF is suspended for a predetermined period, whereby the stability of motion of the focus lens can be secured and the AF responsivity can be prevented from being affected.

Since the embodiments of the present invention are so arranged that the time period for inhibiting the adjustment of the focus lens position is limited to the predetermined time, the period of inhibition of the drive of the focus lens can be kept not unnecessarily long and the response performance of the AF control can be secured.

Since the embodiments of the present invention are so arranged that the above range is located at the viewpoint detection position detected by the viewpoint detecting means for detecting the viewpoint position of the photographer, the embodiments have such advantages that the range for capturing the video state detection signal can be changed depending upon the viewpoint position, whereby the operability is remarkably improved and that even if the input means is so unstable as to easily cause detection errors etc. due to variations of the viewpoint position, the photographer's looking aside, blinks, etc., if the change is short in time, the stable AF operation can be achieved without a malfunction of AF.

Since the embodiments of the present invention are so arranged that the above range is located at a position designated by an external input device such as a mouse or a joy stick, the embodiments have such an advantage that even if the portion for capturing the video state detection signal changes depending upon movement including the instability of the external input device, immediate movement of the focus lens is suspended to prevent a malfunction of the AF control, thereby improving the stability.

Since the embodiments of the present invention are so arranged that if the range for capturing the video state detection signal is changed and if the range thus changed is at a predetermined position in the screen then adjustment of the focus lens position by the adjusting means is inhibited, execution of the AF operation is inhibited or the operation of the AF is suspended for the predetermined period if the range moves to a specific position, whereby the AF operation can be prevented from being immediately executed when the position detecting means is moved to the specific position for a different purpose from selection of the object, thereby securing the stability of the AF.

Since the AF operation is restarted after a lapse of the predetermined time, an object located at the specific position can be selected.

Since the embodiments of the present invention are so arranged that the time period for inhibiting the adjustment of the focus lens position is limited to the predetermined time, the drive inhibition time of the focus lens can be kept not unnecessarily long, and the response performance of the AF control can also be secured.

Since the AF operation is restarted after a lapse of the predetermined period, an object located at the specific position can be selected.

Since the embodiments of the present invention are so arranged that the range is located at a viewpoint detection position detected by the viewpoint detecting means for detecting the viewpoint position of the photographer, the embodiments have such advantages that the range for capturing the video state detection signal can be changed depending upon the viewpoint position, whereby the operability can be remarkably improved and that even if the input means is so unstable as to easily cause the detection errors etc. due to variations of the viewpoint position, the observer's looking aside, blinks, etc., if the change is short in time, the stable AF operation can be realized without a malfunction of the AF.

Since the embodiments of the present invention are so arranged that the range is located at a position designated by an external input device such as a mouse or a joy stick, the embodiments have such an advantage that even if the portion for capturing the video state detection signal changes depending upon movement including instability of the selecting means, immediate movement of the focus lens is suspended to prevent a malfunction of the Af control, thereby improving the stability.

Since the embodiments of the present invention are so arranged that the predetermined position in the screen is set in a display portion of characters, the embodiments have such advantages that the apparatus can prevent the occurrence of unnecessary movement of the focus lens due to restart of the AF operation every time the photographer checks the characters etc., and that because the period of the above inhibition operation is limited to the predetermined time, the AF operation can be restarted when an object which the photographer desires to take is located at the characters.

What is claimed is:

1. An image pickup apparatus comprising:

a focus lens;

detecting means for detecting a predetermined signal corresponding to a predetermined range in an image frame;

adjusting means for adjusting a focus lens position of said focus lens according to the predetermined signal;

selecting means for selecting a position of said predetermined range in the image frame; and control means for inhibiting adjustment of said focus lens position by said adjusting means in response to the position of the predetermined range being changed by said selecting means, to detect whether the position is further changed by said selecting means during a subsequent predetermined time.

2. The apparatus according to claim 1, wherein said selecting means comprises viewpoint detecting means for detecting a viewpoint position of a photographer, said predetermined range being arranged to be located at the detected viewpoint position.

3. The apparatus according to claim 1, wherein said selecting means comprises one of a mouse or a joy stick, said predetermined range being located at a position designated by said one of a mouse or a joy stick.

4. An image pickup apparatus comprising:

a focus lens;

detecting means for detecting a detection signal corresponding to a predetermined range in an image frame;

adjusting means for adjusting a position of said focus lens according to the detection signal;

selecting means for selecting the position of the predetermined range in the image frame; and control means for inhibiting restarting of adjustment of the focus lens position by said adjusting means in the case that the position of the predetermined range is changed by said selecting means and if the detection signal does not satisfy a predetermined condition, to detect whether the position is further changed by said selecting means during a subsequent predetermined time.

5. The apparatus according to claim 4, wherein a time period for inhibiting the adjustment of said position of the focus lens by said control means is within a predetermined time.

6. The apparatus according to claim 4, wherein said selecting means comprises viewpoint detecting means for detecting a viewpoint position of a photographer, said predetermined range being located at the detected viewpoint position detected.

7. The apparatus according to claim 4, wherein said selecting means comprises one of a mouse or a joy stick, said predetermined range being located at a position designated by said one of a mouse or a joy stick.

8. An image pickup apparatus comprising:

a focus lens;

detecting means for detecting a detection signal corresponding to a predetermined range in an image frame;

adjusting means for adjusting a position of said focus lens according to the detection signal;

selecting means for selecting a position of the predetermined range; and control means for inhibiting restarting of adjustment of the focus lens position of said adjusting means in response to the position of the predetermined range being changed by said selecting means and/or if the changed position is located at a predetermined position on a screen, to detect whether the position is further changed by said selecting means during a subsequent predetermined time.

9. The apparatus according to claim 8, wherein said selecting means comprises viewpoint detecting means for detecting a viewpoint position of a photographer, said predetermined range being located at the detected viewpoint position.

10. The apparatus according to claim 8, wherein said selecting means comprises one of a mouse or a joy stick, said predetermined range being located at a position designated by said one of a mouse or a joy stick.

11. The apparatus according to claim 8, wherein said predetermined position on the screen is a position where a character is displayed.

12. An image processing apparatus comprising:

image processing means for processing a moving image signal;

position determination means for determining a position of an image signal processing area on a screen for extracting the moving image signal in a screen;

adjusting means for performing a predetermined adjustment based on the image signal corresponding to an inside of said image signal processing area; and control means for stopping at least a part of an operation of said adjusting means and for restarting the operation of said adjusting means after the position of said image signal processing area is determined by said position determination means and a predetermined time has passed, to discriminate whether the position is further changed by said position determination means during a subsequent predetermined time.

13. The apparatus according to claim 12, wherein said position determination means comprises means for determining a position of a distance measurement area for detecting a focus state on said screen, and wherein said adjusting means comprises means for detecting a predetermined signal component changing according to sharpness from said image signal to detect the focus state.

14. The apparatus according to claim 13, wherein said control means inhibits restart of a focus detection operation of said adjusting means.

15. The apparatus according to claim 12, wherein said position determination means comprises designating means for designating a setting position of said image signal processing area on said screen.

16. The apparatus according to claim 15, wherein said designating means comprises viewpoint detecting means for detecting a viewpoint position of a photographer, said image signal processing area located at the detected viewpoint position.

17. The apparatus according to claim 15, wherein said designating means comprises one of a mouse or a joy stick, said image signal processing area being located at the position designated by said one of a mouse or a joy stick.

18. An image processing apparatus comprising:

position determining means for movably determining a position of an image signal processing area on a screen;

image signal processing means for performing a predetermined process for an image signal corresponding to an inside of said image signal processing area; and control means for inhibiting an operation of said image signal processing means for a predetermined period if the position of said image signal processing area on said screen is moved and located at a predetermined area on said screen by said position determining means after the processing by said image signal processing means is performed.

19. The apparatus according to claim 18, further comprising character display means for displaying information on said screen, and wherein said predetermined area is an area in which the information is displayed by said character display means.

20. The apparatus according to claim 19, wherein said position determination means comprises designating means for designating a setting position of said image signal processing area on said screen.

21. The apparatus according to claim 20, wherein said designating means comprises viewpoint detecting means for detecting a viewpoint position of a photographer, said image signal processing area being located at the detected viewpoint position.

22. The apparatus according to claim 20, wherein said designating means comprises one of a mouse or a joy stick, said image signal processing area being located at a position designated by said one of a mouse or a joy stick.

23. An image processing apparatus comprising:

image signal processing means for movably setting an image signal processing area on a screen and performing a predetermined process for an image signal corresponding to an inside of said image signal processing area;

display means for displaying predetermined data on said screen; and control means for inhibiting execution of said process by said image signal processing means in the case that the image signal processing area is to be moved to a position where said predetermined data is displayed by said display means.

24. The apparatus according to claim 23, wherein said image signal processing means comprises means for performing focus detection from said image signal, and wherein said image signal processing area comprises a distance measurement area.

25. The apparatus according to claim 23, wherein said control means inhibits an operation of said image signal processing means for a predetermined time when said image signal processing area is moved to said display position, and wherein said control means allows said operation after a lapse of said predetermined time.

26. The apparatus according to claim 23, wherein said image signal processing means comprises viewpoint detecting means for detecting a viewpoint position of a photographer, said image signal processing area being located at the detected viewpoint position.

27. The apparatus according to claim 23, wherein said image signal processing means comprises one of a mouse or a joy stick, said image signal processing area being located at the position designated by said one of a mouse or a joy stick.

28. Apparatus according to claim 23, wherein said control means inhibits the execution of said process by said image signal processing means for a predetermined time.

* * * * *

UNITED STATES PATENT AND TRADEMARK OFFICE
CERTIFICATE OF CORRECTION

PATENT NO. : 6,278,489 B1  Page 1 of 1
DATED : August 21, 2001
INVENTOR(S) : Masahide Hirasawa It is certified that error appears in the above-identified patent and that said Letters Patent is hereby corrected as shown below:

Title page,
Item [56] References Cited, FOREIGN PATENT DOCUMENTS, "4154165" should read -- 4-154165 --.

Column 8,
Line 22, "volumes are" should read -- are volumes --.

Column 14,
Line 59, "of" should read -- of the -- and "the" should be deleted.

Column 16,
Line 52, "are" should be deleted.

Column 18,
Line 25, "of" should read -- of the -- and "the" should be deleted.

Column 22,
Line 12, "detected" should be deleted.

Signed and Sealed this

Second Day of April, 2002

Attest:

JAMES E. ROGAN
*Attesting Officer*  *Director of the United States Patent and Trademark Office*